United States Patent
Bloom et al.

(10) Patent No.: US 11,784,673 B2
(45) Date of Patent: Oct. 10, 2023

(54) ELECTRONIC DEVICE HOUSING HAVING A RADIO-FREQUENCY TRANSMISSIVE COMPONENT

(71) Applicant: Apple Inc., Cupertino, CA (US)

(72) Inventors: Daniel R. Bloom, Cupertino, CA (US); Chelsea E. Wojeski, Sunnyvale, CA (US); Edward Siahaan, San Francisco, CA (US); Nathan Morris, Cupertino, CA (US); Ryan S. Haley, Sunnyvale, CA (US); Tian Shi Li, Cupertino, CA (US); Toni Ristoski, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/469,001

(22) Filed: Sep. 8, 2021

(65) Prior Publication Data
US 2022/0085843 A1    Mar. 17, 2022

Related U.S. Application Data

(60) Provisional application No. 63/079,419, filed on Sep. 16, 2020.

(51) Int. Cl.
*H04B 1/3827*     (2015.01)

(52) U.S. Cl.
CPC ................. *H04B 1/3827* (2013.01)

(58) Field of Classification Search
CPC .... G04G 21/025; G04R 60/06; G06F 1/1626; G06F 1/163; G06F 1/1698; H01Q 1/243; H01Q 1/273; H01Q 1/44; H04B 1/3827
See application file for complete search history.

(56) References Cited

U.S. PATENT DOCUMENTS

| | | | |
|---|---|---|---|
| 4,567,318 A | 1/1986 | Shu | |
| 6,532,152 B1 | 3/2003 | White et al. | |
| 6,625,394 B2 | 9/2003 | Smith et al. | |
| 6,775,133 B2 | 8/2004 | Konishi | |
| 7,377,767 B2 | 5/2008 | Dubuis et al. | |
| 7,684,178 B2 | 3/2010 | Hsu et al. | |
| 7,697,281 B2 | 4/2010 | Dabov et al. | |
| 7,713,054 B2 | 5/2010 | Mai | |

(Continued)

FOREIGN PATENT DOCUMENTS

| | | |
|---|---|---|
| CN | 202540623 | 11/2012 |
| CN | 111052502 | 4/2020 |

(Continued)

OTHER PUBLICATIONS

Bourchak et al., "Effect of Preheating and Post-Curing Time on the Mechanical Properties of Epoxy Resin," Advanced Composites Letters, vol. 22, Issue 5, 2013.

(Continued)

*Primary Examiner* — Nguyen T Vo
(74) *Attorney, Agent, or Firm* — Brownstein Hyatt Farber Schreck, LLP

(57) ABSTRACT

An electronic device component including a thermoset composite material is described herein. The electronic device component may be a structural component of the housing and define an exterior surface of the housing. The electronic device component may also be transparent to radio-frequency signals.

14 Claims, 20 Drawing Sheets

(56) References Cited

U.S. PATENT DOCUMENTS

| | | |
|---|---|---|
| 7,798,804 B2 | 9/2010 | Kmoch et al. |
| 7,829,786 B2 | 11/2010 | Fuerstenberg et al. |
| 7,830,317 B2 | 11/2010 | Yamazaki |
| 8,191,756 B2 | 6/2012 | Coppeta et al. |
| 8,345,410 B2 | 1/2013 | Ternus et al. |
| 8,373,980 B2 | 2/2013 | Reber |
| 8,380,258 B2 | 2/2013 | Kim et al. |
| 8,506,327 B2 | 8/2013 | Jol |
| 8,519,286 B1 | 8/2013 | Bloch |
| 8,537,543 B2 | 9/2013 | Wang et al. |
| 8,553,907 B2 | 10/2013 | Thomason et al. |
| 8,620,395 B2 | 12/2013 | Kang et al. |
| 8,654,029 B2 | 2/2014 | Fan et al. |
| 8,665,160 B2 | 3/2014 | Uttermann et al. |
| 8,686,297 B2 | 4/2014 | Shiu et al. |
| 8,773,847 B2 | 7/2014 | Byun et al. |
| 8,878,060 B2 | 11/2014 | Wright et al. |
| 8,884,826 B2 | 11/2014 | Wu et al. |
| 8,947,303 B2 | 2/2015 | Golko et al. |
| 8,980,026 B2 | 3/2015 | Ely |
| 9,036,358 B2 | 5/2015 | Shoji et al. |
| 9,049,801 B2 | 6/2015 | Rothkopf et al. |
| 9,075,567 B2 | 7/2015 | Mathew et al. |
| 9,109,093 B2 | 8/2015 | Pilliod et al. |
| 9,146,588 B2 | 9/2015 | Kole et al. |
| 9,209,513 B2 * | 12/2015 | Ely ........................ H01Q 1/243 |
| 9,223,349 B2 | 12/2015 | Franklin et al. |
| 9,229,675 B2 | 1/2016 | Beeze et al. |
| 9,282,657 B2 | 3/2016 | Miyaoka et al. |
| 9,338,909 B2 | 5/2016 | Tanaka |
| 9,338,910 B2 | 5/2016 | Hattori |
| 9,360,889 B2 | 6/2016 | Idsinga et al. |
| 9,408,009 B1 | 8/2016 | Witte et al. |
| 9,469,469 B2 | 10/2016 | Rayner |
| 9,516,150 B2 | 12/2016 | Jeon et al. |
| 9,520,638 B2 | 12/2016 | Baringer et al. |
| 9,537,526 B2 | 1/2017 | Wilson et al. |
| 9,564,677 B2 | 2/2017 | Tiang et al. |
| 9,578,145 B2 | 2/2017 | Chang |
| 9,591,110 B2 | 3/2017 | Hill et al. |
| 9,606,579 B2 | 3/2017 | Pakula et al. |
| 9,629,268 B2 | 4/2017 | Lee et al. |
| 9,643,349 B2 | 5/2017 | Montevirgen |
| 9,680,206 B2 | 6/2017 | Youn et al. |
| 9,791,893 B2 | 10/2017 | Yamaguchi et al. |
| 9,795,044 B2 | 10/2017 | Lai et al. |
| 9,871,898 B2 | 1/2018 | Kwong |
| 9,907,191 B2 | 2/2018 | Shi et al. |
| 9,977,460 B2 | 5/2018 | Man et al. |
| 9,985,345 B2 | 5/2018 | Ferretti et al. |
| 10,144,000 B2 | 12/2018 | Goyal et al. |
| 10,158,384 B1 | 12/2018 | Yarga et al. |
| 10,180,702 B2 | 1/2019 | Dabov et al. |
| 10,191,519 B2 | 1/2019 | Lilje |
| 10,218,827 B2 | 2/2019 | Hill et al. |
| 10,264,685 B2 | 4/2019 | Shi et al. |
| 10,367,538 B2 | 7/2019 | Lai et al. |
| 10,368,456 B2 | 7/2019 | Shinn |
| 10,372,166 B2 | 8/2019 | Gable et al. |
| 10,418,693 B2 | 9/2019 | Xu et al. |
| 10,559,872 B2 | 2/2020 | Hill et al. |
| 10,617,016 B2 | 4/2020 | Shi et al. |
| 10,897,825 B2 | 1/2021 | Shi et al. |
| 11,522,983 B2 | 12/2022 | Bates et al. |
| 2008/0268083 A1 | 10/2008 | Ferenc |
| 2009/0141436 A1 | 6/2009 | Matsuoka et al. |
| 2010/0230155 A1 | 9/2010 | Hashizume et al. |
| 2012/0041170 A1 * | 2/2012 | Benes .................... C08G 77/26 |
| | | 556/425 |
| 2012/0319907 A1 | 12/2012 | Wu et al. |
| 2013/0235538 A1 | 9/2013 | Hashimoto et al. |
| 2014/0004294 A1 | 1/2014 | Christophy et al. |
| 2014/0023430 A1 | 1/2014 | Prest et al. |
| 2014/0071651 A1 | 3/2014 | Wittenberg et al. |
| 2014/0206420 A1 | 7/2014 | Neichi |
| 2014/0361945 A1 * | 12/2014 | Misra .................... H01Q 1/243 |
| | | 427/124 |
| 2015/0062807 A1 | 3/2015 | Gwin et al. |
| 2015/0167193 A1 | 6/2015 | Demers |
| 2015/0188215 A1 | 7/2015 | Jarvis |
| 2016/0006109 A1 | 1/2016 | Nil et al. |
| 2016/0120046 A1 | 4/2016 | Ou et al. |
| 2017/0048991 A1 | 2/2017 | Young et al. |
| 2017/0069956 A1 | 3/2017 | Hill et al. |
| 2017/0308123 A1 | 10/2017 | McClure et al. |
| 2017/0347470 A1 | 11/2017 | Seo et al. |
| 2018/0004247 A1 | 1/2018 | Qing et al. |
| 2018/0081400 A1 | 3/2018 | Pandya et al. |
| 2018/0129170 A1 | 5/2018 | Min et al. |
| 2018/0262226 A1 | 9/2018 | Aycan et al. |
| 2019/0036201 A1 | 1/2019 | Hill et al. |
| 2019/0208648 A1 | 7/2019 | Shi et al. |
| 2019/0254185 A1 | 8/2019 | Cater et al. |
| 2020/0014098 A1 | 1/2020 | Xu et al. |
| 2020/0026108 A1 | 1/2020 | Metin et al. |
| 2020/0073445 A1 | 3/2020 | Kuna et al. |
| 2020/0153088 A1 | 5/2020 | Hill et al. |
| 2020/0221002 A1 | 7/2020 | Akana et al. |
| 2020/0249724 A1 | 8/2020 | Myers et al. |
| 2022/0024182 A1 * | 1/2022 | Liao ........................ B32B 15/08 |
| 2022/0115770 A1 | 4/2022 | Hill et al. |
| 2023/0072518 A1 | 3/2023 | Renda et al. |
| 2023/0091853 A1 | 3/2023 | Parker et al. |

FOREIGN PATENT DOCUMENTS

| | | |
|---|---|---|
| EP | 1225652 | 7/2002 |
| EP | 2838157 | 2/2015 |
| WO | WO2020/055377 | 3/2020 |

OTHER PUBLICATIONS

Domun et al., "Improving the fracture toughness and the strength of epoxy using nanomaterials—a review of the current status," Royal Society of Chemistry, Nanoscale, 7, pp. 10294-10329, 2015.

\* cited by examiner

ELECTRONIC DEVICE HOUSING HAVING A RADIO-FREQUENCY TRANSMISSIVE COMPONENT

CROSS-REFERENCE TO RELATED APPLICATION(S)

This application is a nonprovisional application of and claims the benefit of U.S. Provisional Patent Application No. 63/079,419, filed Sep. 16, 2020 and titled "Electronic Device Housing Having a Radio-Frequency Transmissive Component," the disclosure of which is hereby incorporated herein by reference its entirety.

FIELD

The described embodiments relate generally to components for electronic devices which include a thermoset composite material. More particularly, the present embodiments relate to housing or enclosure components that enable operation of wireless components of the electronic devices.

BACKGROUND

Some electronic devices may include wireless and/or RF-transmitting components that are configured to communicate or otherwise operably couple to other devices. Some electronic devices are formed from plastic housings or enclosures, which enable the transmission of various wireless signals. However, if an enclosure or housing is formed from a metal material, the conductive nature of the metal material may interfere with the signal transmission.

The systems and techniques described herein are directed to electronic devices that include a housing having an RF-transmissive component for facilitating wireless signal transmission.

SUMMARY

Embodiments described herein relate to components for electronic devices that include a thermoset composite material. The component including the thermoset composite material may be a component of the housing and may define an exterior surface of the housing. In some cases, the housing component is a structural component of the housing.

A housing component including a thermoset composite material may have a combination of properties which makes it suitable for use as a structural component of the housing. For example, such a housing component may be capable of being machined and polished but may still have sufficient strength and toughness to be scratch and impact resistant in use. In some cases, the housing component may resist brittle failure, substantial deformation, and/or separation from an adjoining housing component during a drop event. In addition, the housing component including the thermoset composite may be colorable to match a color of an adjoining housing component.

In some cases, the component including the thermoset composite material may form a transmissive window for an internal component of the device. For example, the component including the thermoset composite material may form a window for an emitter component, a receiver component, and/or a transceiver component positioned within the housing. In some cases, the component including the thermoset composite material may form a window for an antenna or a sensor. For example, the antenna may be operably coupled to wireless transmission circuitry of the electronic device. The component including the thermoset composite material may be transparent to radio-frequency signals.

The component including the thermoset composite material may be a dielectric component. In some cases, a radio-frequency (RF) transparent dielectric component forms a window for an RF transmitter, an RF receiver, and/or an RF transceiver. In additional cases, the dielectric component may provide electrical isolation between two electrically conductive housing components.

The thermoset composite material of the component typically includes a thermoset polymer which forms a cross-linked network. For example, the thermoset polymer may be an epoxy-based polymer or a polyurethane-based polymer. The thermoset composite material typically also includes nano-sized inorganic particles, such as silica particles. These nano-sized inorganic particles may be distributed in a matrix of the thermoset polymer. The thermoset composite material may also include additional components such as one or more pigments.

The disclosure herein also relates to electronic device housings and electronic devices including the components described herein. The electronic device typically includes device components positioned within the housing, such as a display, one or more sensors, and/or a battery. In some examples, the electronic device includes one or more components of a wireless communication system.

The disclosure provides an electronic device comprising a housing. The housing comprises a first housing component formed from a first metal material and defining a first portion of an exterior surface of the housing and a second housing component formed from a second metal material and defining a second portion of the exterior surface of the housing. The housing further comprises a dielectric component positioned between and bonded to the first and the second housing components, the dielectric component including a thermoset composite material comprising an epoxy matrix and nano-sized oxide particles dispersed within the epoxy matrix.

In addition, the disclosure provides an electronic device comprising a radio-frequency (RF) component and an enclosure at least partially surrounding the RF component. The enclosure comprises a housing formed from a metal material and defining an exterior surface, a first surface extending inward from a first portion of the exterior surface, and a second surface facing the first surface and extending inward from the second portion of the exterior surface. The enclosure further comprises a window formed from an RF-transmissive material, positioned over the RF component, and adhered to the first and the second surfaces, the RF-transmissive material including a thermoset composite material comprising nano-sized silica particles dispersed within a thermoset matrix.

The disclosure further provides a housing comprising a housing component formed from a metal material, having a textured wall, and defining a first portion of an exterior surface of the housing and a structural component bonded to the textured wall and defining a second portion of the exterior surface. The structural component is formed from a thermoset composite material comprising a cross-linked epoxy material and nano-sized oxide particles dispersed within the cross-linked epoxy material.

BRIEF DESCRIPTION OF THE DRAWINGS

The disclosure will be readily understood by the following detailed description in conjunction with the accompanying drawings, wherein like reference numerals designate like elements.

Figure 1A:
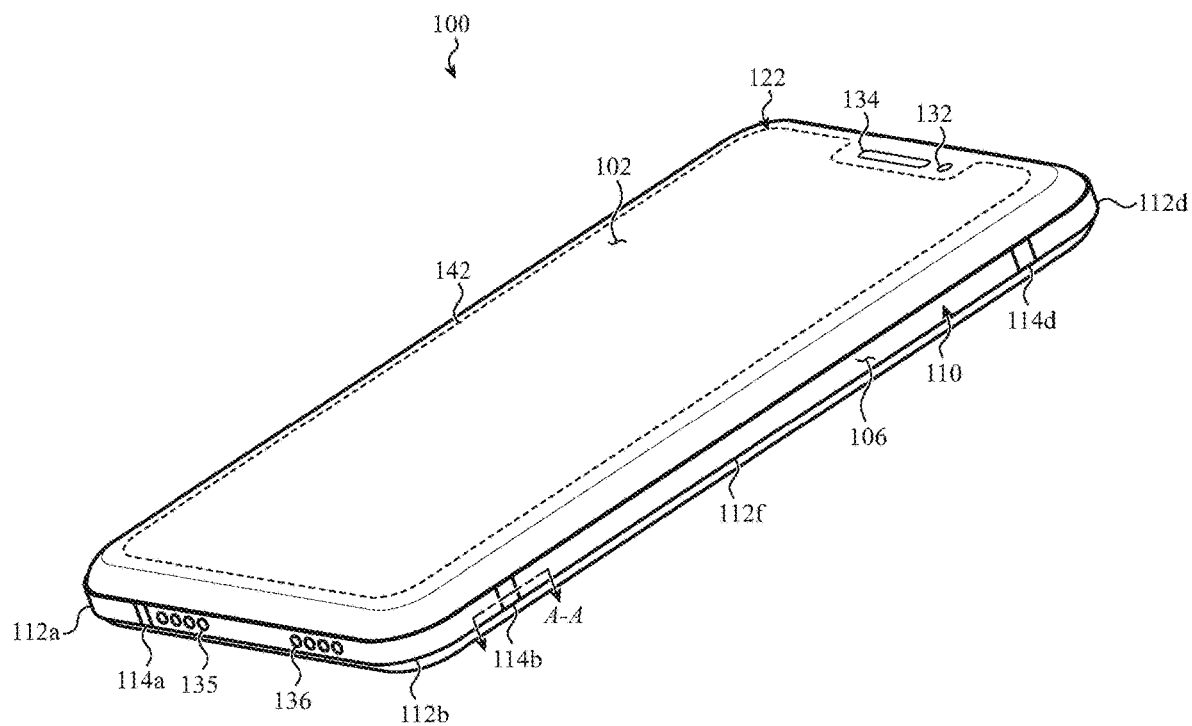
FIGS. 1A and 1B show views of an example electronic device.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Reference will now be made in detail to representative embodiments illustrated in the accompanying drawings. It should be understood that the following descriptions are not intended to limit the embodiments to one preferred implementation. To the contrary, the described embodiments are intended to cover alternatives, modifications, and equivalents as can be included within the spirit and scope of the disclosure and as defined by the appended claims.

The following disclosure relates to components for electronic devices, the components including a thermoset composite material. In some cases, a component including a thermoset composite material may be included in the housing of the electronic device. Such a housing component may have a combination of properties which makes it suitable for use as a structural component of the housing. For example, such a housing component may be capable of being machined and polished but may still have sufficient strength and toughness to be scratch and impact resistant in use. In some cases, the housing component may resist brittle failure, substantial deformation, and/or separation from an adjoining housing component during a drop event. In addition, the housing component including the thermoset composite may be colorable to match a color of an adjoining housing component.

In some cases, the housing of the electronic device also includes one or more housing components formed from a material other than the thermoset composite material. For example, the other housing component(s) may be formed from a metal, a glass, a glass-ceramic, a ceramic, or a combination of these materials. The housing component including the thermoset composite material may be bonded to one or more of these other housing components to provide structural integrity to the housing. In some embodiments, one or more housing components are formed from a metal material and a surface of the metal material is anodized to produce an anodization layer after the housing components are assembled with the component formed from the thermoset composite material. In some cases, the housing component including the thermoset composite material may be resistant to degradation and/or color change during processes such as an anodization or a physical vapor deposition process.

In additional cases, the component including the thermoset composite material may be positioned within an electronic device housing rather than serving as a housing component. In some examples, the thermoset composite material is part of an assembly positioned within the housing of the electronic device. When structural integrity of this interior assembly is important, the assembly component including a thermoset composite material can help provide structural support to the assembly. For example, the assembly may include a component formed from the thermoset composite material and one or more components formed from a metal. The component formed from the thermoset composite material may be bonded to the metal components to provide structural integrity to the assembly. In some cases, the component formed from the thermoset composite material may electrically isolate two or more components formed from a metal. The assembly may be positioned within a housing formed from one or more dielectric and/or low magnetic permeability materials.

The component including the thermoset composite material may be a dielectric component. In some cases, the dielectric properties of the component may allow sufficient transmission of radio waves that the component is considered to be transparent to radio frequencies. For example, the dielectric constant (relative permittivity) may be sufficiently low at a frequency range of interest to allow transmission of radio waves. The frequency range may be from a "low band" frequency range (e.g., less than 1 GHz, such as about 400 MHz to less than 1 GHz, about 600 MHz to about 900 MHz, or 600 MHz to 700 MHz), a "mid-band" frequency range (e.g., about 1 GHz to about 6 GHz, such as about 1 GHz to about 2.6 GHz, about 2 GHz to about 2.6 GHz, about 2.5 GHz to about 3.5 GHz, or about 3.5 GHz to about GHz), or a "high-band" frequency range (e.g., about 24 GHz to about 40 GHz, about 57 GHz to about 64 GHz, or about 64 GHz to about 71 GHz). In addition, wireless charging ranges may broadly be from about 80 kHz to about 300 kHz or from about 110 kHz to about 205 kHz. When the housing comprises electrically conducting components, a dielectric housing component may provide a window for an RF transmitter, an RF receiver and/or an RF transceiver. For example, the RF transmitter, RF receiver, and/or a RF transceiver may be part of a wireless communication system or a wireless charging system.

In additional cases, the dielectric component provides at least some extent of electrical isolation or insulation between two electrically conducting components. For example, a dielectric housing component may provide conductive and/or capacitive isolation between the two electrically conducting housing components. In some cases, at least one of the two electrically conducting housing components is configured to operate as an antenna. For example, at least one of the two electrically conducting housing components may be configured to radiate electromagnetic radiation for a wireless communication system. The dielectric housing component may electrically isolate this antenna from the other electrically conductive housing component.

In further cases, the component including the thermoset composite material may have properties suitable for allowing transmission of energy through electromagnetic induction. For example, the component including the thermoset composite material may form a window for an emitter, receiver, or transceiver for an inductive coupling wireless charging system. In some cases, the inductive coupling wireless charging system may be a resonant inductive coupling wireless charging system. The thermoset composite material may have a magnetic permeability sufficiently low that it does not interfere with transmission of magnetic fields generated by the inductive coupling wireless charging system.

Figure 1B:
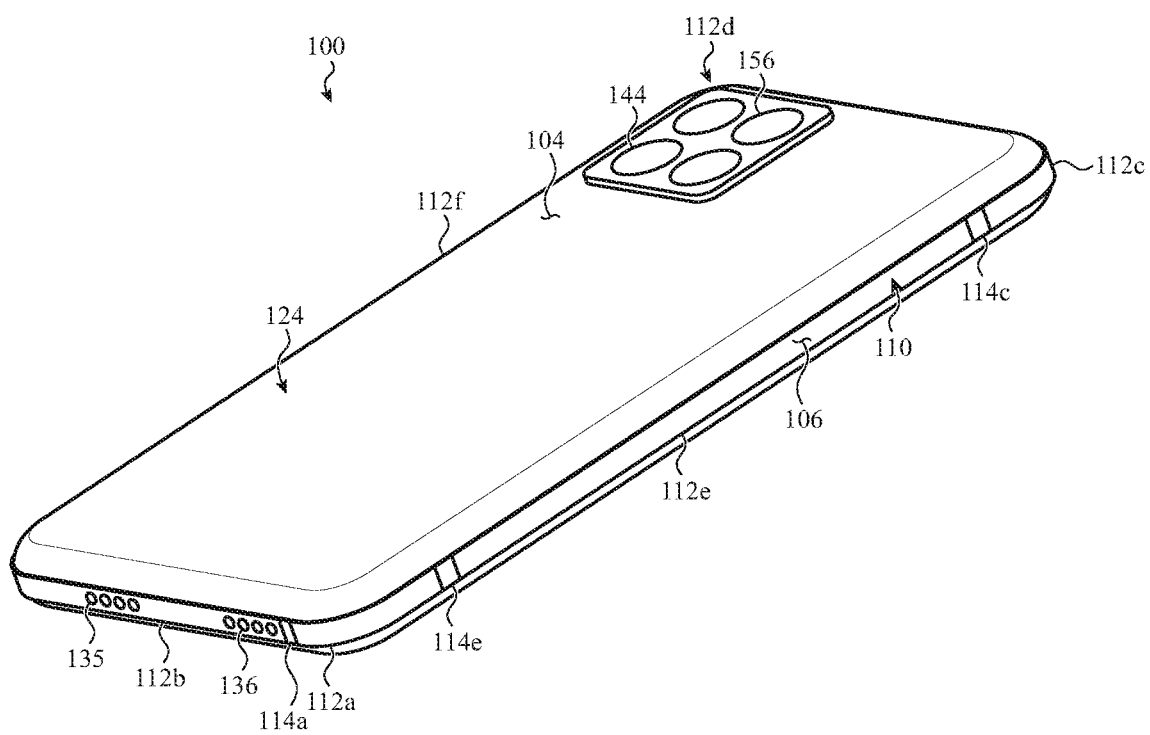
Figure 16:
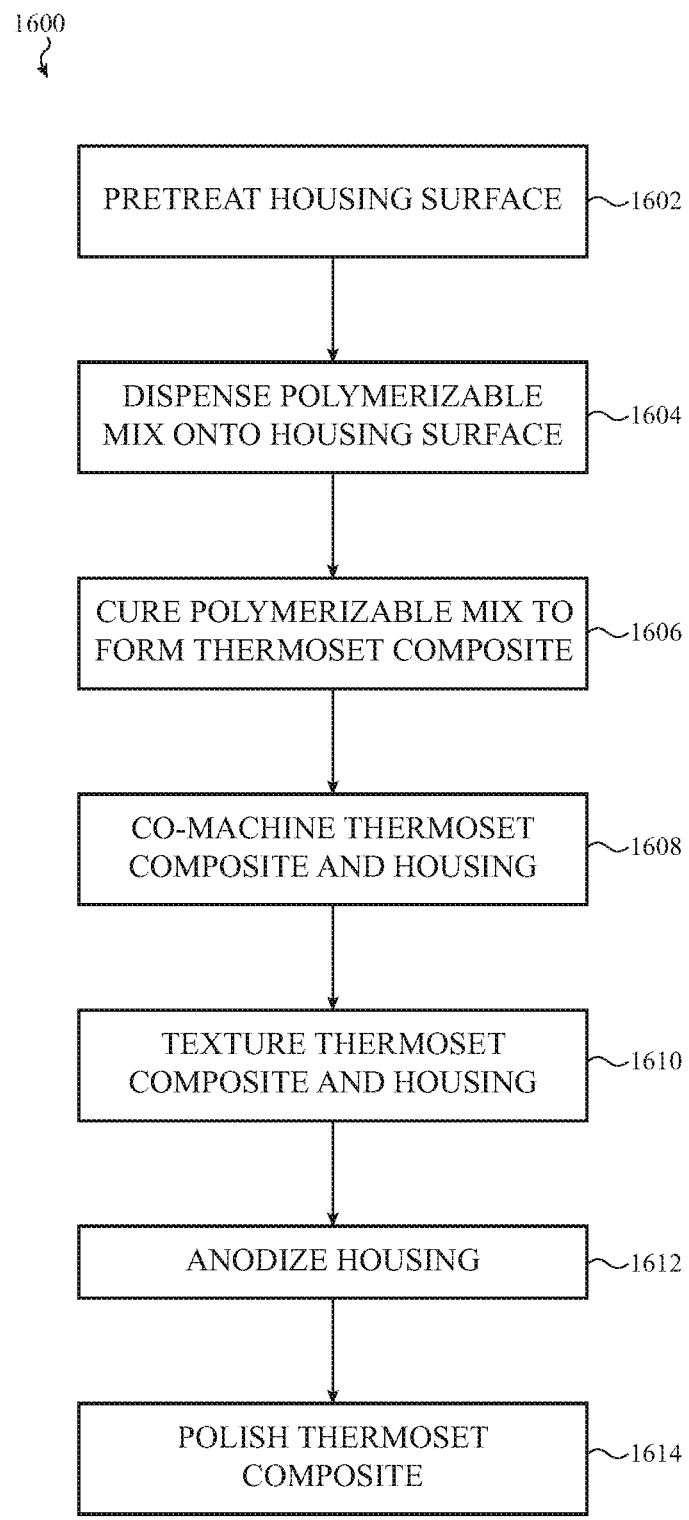
FIG. 16 shows a flow chart of an example process for forming a housing including a thermoset composite component.

A component predominantly composed of the thermoset composite material may be referred to herein as a thermoset composite component. A thermoset composite component may also be referred to as being formed from the thermoset composite material. In embodiments, the thermoset composite material includes a thermoset polymer, such as an epoxy-based polymer or a polyurethane-based polymer, which forms a cross-linked network. These examples of thermoset polymers may also be referred to herein as cross-linked epoxy materials and cross-linked polyurethane materials. The thermoset composite material typically also includes nano-sized inorganic particles, such as silica particles or other oxide particles. Including the nano-sized inorganic particles in the thermoset composite material can increase the strength and the toughness of the thermoset composite material as compared to thermoset polymer alone. The nano-sized inorganic particles may also affect the dielectric properties of the material. In some cases, the thermoset composite material further includes pigments which help to impart a durable color to the thermoset composite component. The description of thermoset composite materials provided with respect to FIGS. 1A, 1B, and 16 is generally applicable here and, for brevity, is not repeated here.

In some cases, a structural housing component including a thermoset composite material has an ability to resist deformation without being overly brittle. The strength of a thermoset housing component may be indicated by one or more mechanical properties of the thermoset composite material, such as the hardness, the elastic modulus, or the fracture strength of the thermoset composite material. The ductility and the toughness of the thermoset composite component may be indicated by one or more additional mechanical properties of the thermoset composite material. For example, the ductility of the thermoset composite material may be indicated by the percent elongation or by the impact strength of the material. In some examples the mechanical property is measured at room temperature. The thermoset composite component may also be configured to have one or more thermal properties, such as a glass transition temperature, compatible with any manufacturing processes that occur after the thermoset composite is cured. The thermoset composite component may also have a shrinkage less than a threshold value.

As previously mentioned, the housing component including the thermoset composite material may be bonded to one or more adjacent components of the housing to provide structural integrity to the housing. In some cases, the bonding between the thermoset composite housing component and an adjacent housing component is enhanced by modifying a surface of the adjacent housing component. For example, the surface of the adjacent housing component can be modified by one or more of mechanical texturing, chemical etching, anodization, use of a primer, and the like. In further cases, a thermoset composite component may be structurally interlocked with larger scale retention features on the adjacent housing component. The bond strength between the thermoset composite material and the material of the adjoining housing component may be indicated by the lap shear strength between the thermoset composite material and the material of the adjoining housing component.

The disclosure herein also relates to electronic device housings and electronic devices including a component comprising a thermoset composite material. In some cases, the electronic device includes a wireless communication system. Wireless communication protocol and standards may include established protocols and standards such as IEEE 802.11x, GSM, LTE, CDMA, TDMA, 3G, 4G, 5G, Bluetooth, Bluetooth Low Energy (BLE), ISO/IEC 18000-3, Wi-Fi, Radio-frequency identification (RFID), Near-Field Communication (NFC), Global Positioning System (GPS), or any other target wireless communication protocol or standard (including yet-to-be-developed protocols and/or standards). As examples, the wireless communication may be a radio-frequency or an infrared communication system. The electronic device typically includes other components positioned within the device, such as a display, one or more sensors, and/or a battery.

These and other embodiments are discussed below with reference to FIGS. 1A to 18. However, those skilled in the art will readily appreciate that the detailed description given herein with respect to these figures is for explanatory purposes only and should not be construed as limiting.

FIGS. 1A and 1B show an example of an electronic device or simply "device" 100. For purposes of this disclosure, the device 100 may be a portable electronic device including, for example a mobile phone, tablet computer, a portable computer, a wearable electronic device, a portable music player, a health monitoring device, a portable terminal, wireless charging device, device accessory, or other portable or mobile device. In the example of FIGS. 1A and 1B, the dimensions and form factor, including the ratio of the length of its long sides to the length of its short sides, correspond to those of a mobile phone. However, this example is not limiting and examples of other device form factors are shown in FIGS. 7A, 7B, 10, 12, 14A, 15A, and 15B.

Figure 7A:
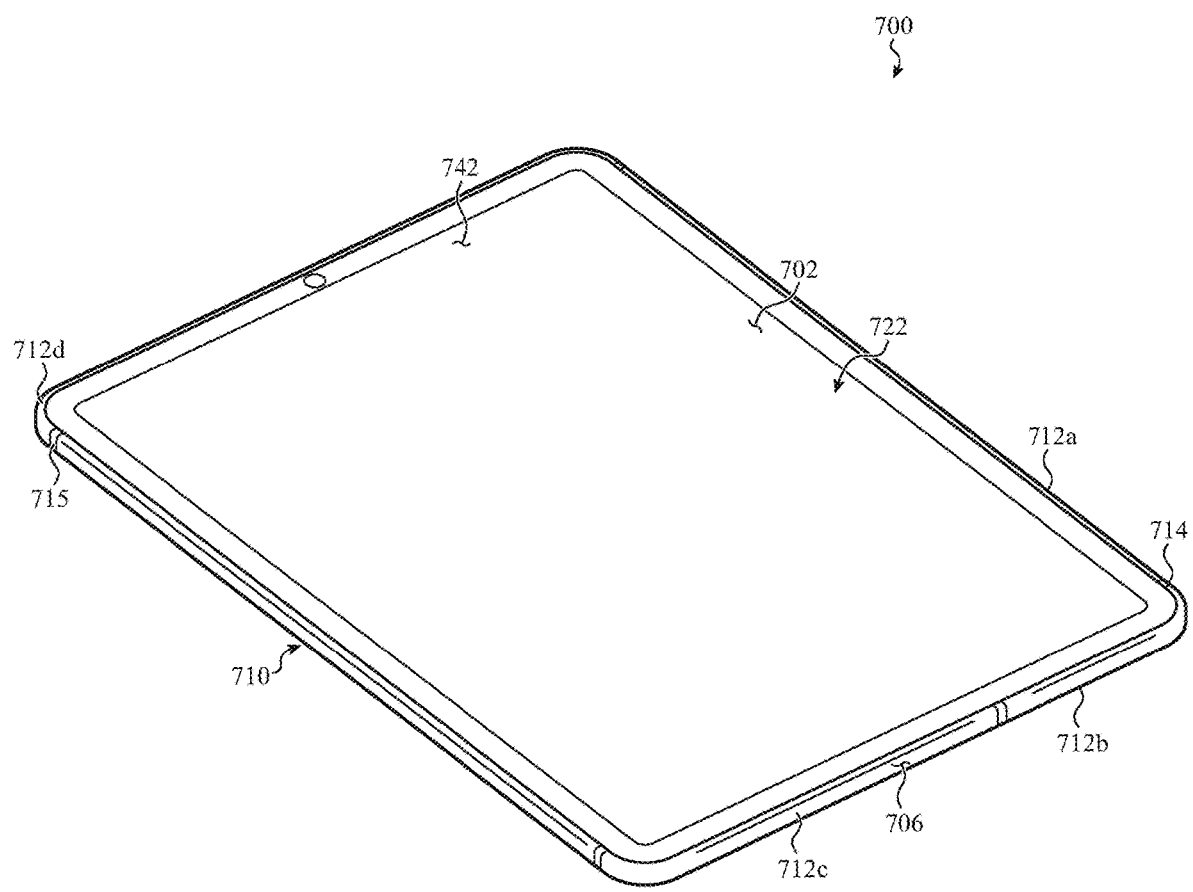
FIGS. 7A and 7B show views of an additional example electronic device.
Figure 7B:
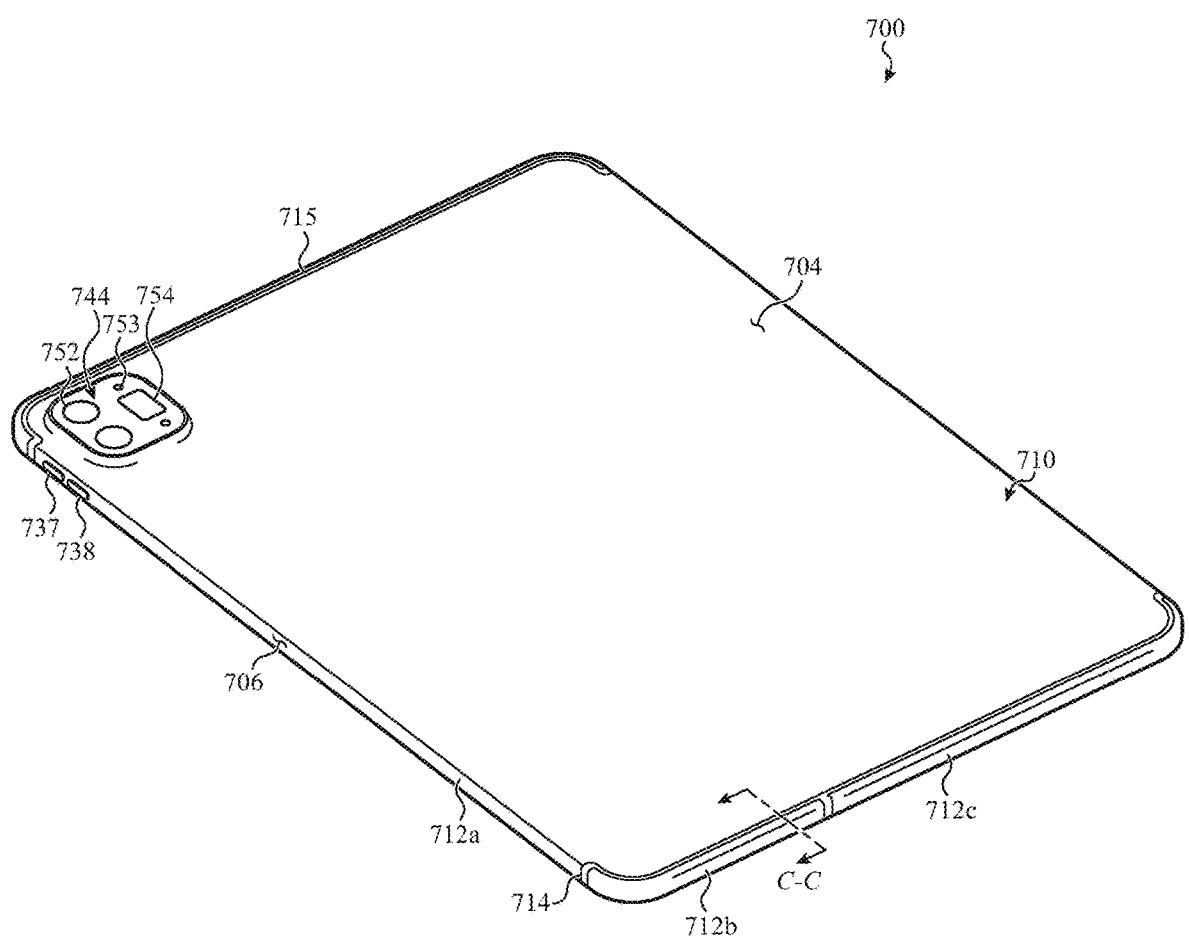
Figure 14A:
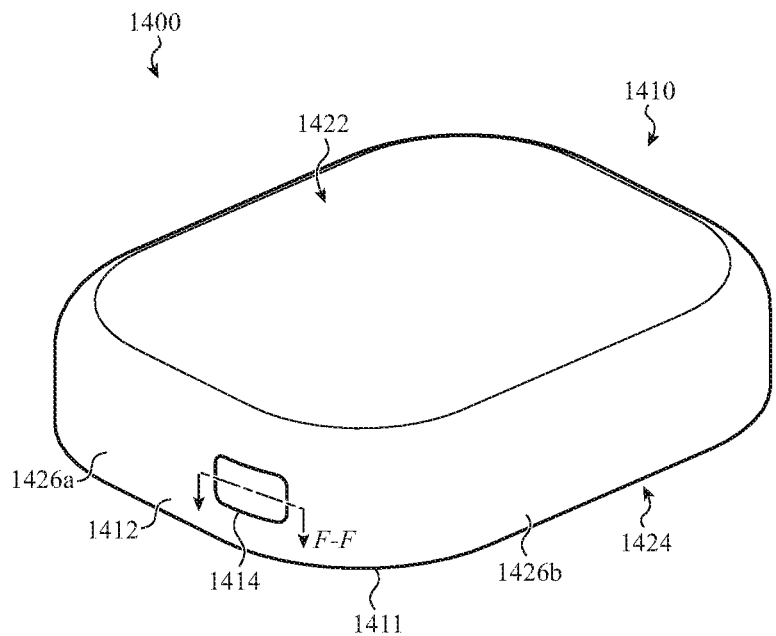
FIGS. 14A and 14B show an additional example of an electronic device.
Figure 15A:
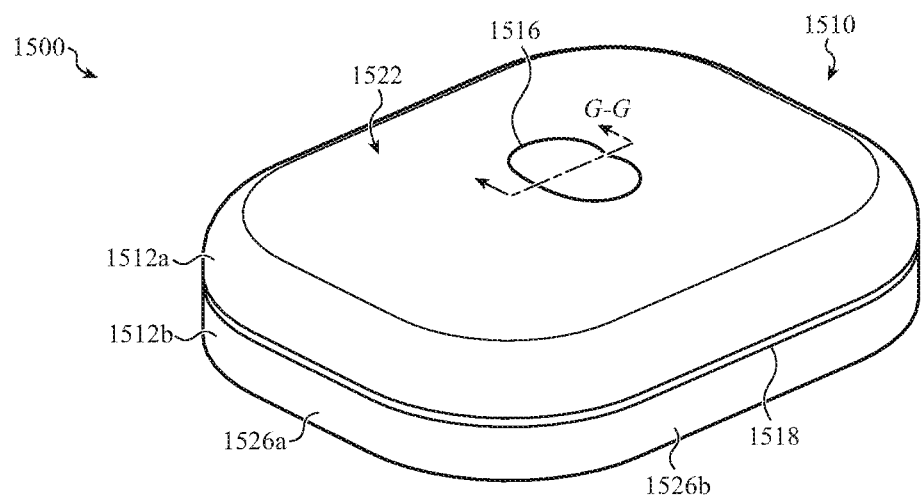
FIGS. 15A, 15B, and FIG. 15C show another example electronic device.
Figure 15B:
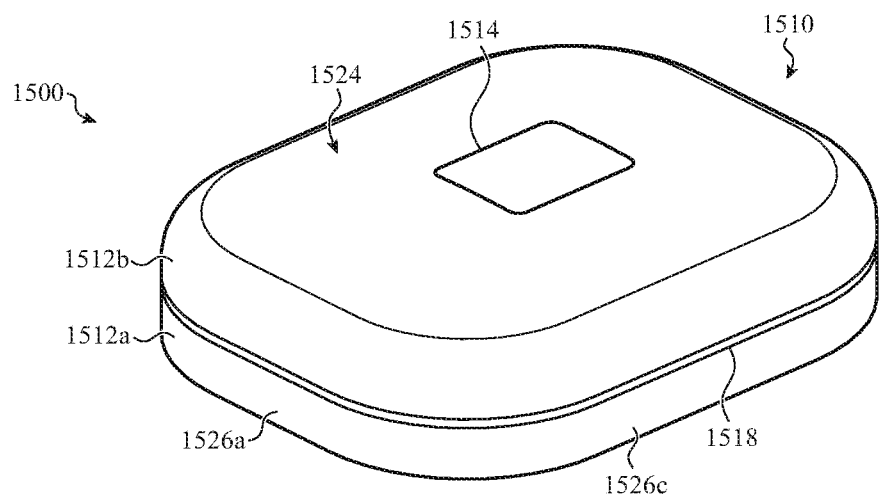

In the example of FIGS. 1A and 1B, the device 100 includes a housing 110, a front cover 122, and a rear cover 124. The housing 110 and the front and rear covers 122 and 124 enclose internal components of the electronic device and may be referred to collectively herein as an enclosure. In some cases, the device includes a support plate and/or additional internal structural components that are used to support internal electronic circuitry or electronic components. The example of FIGS. 1A and 1B is not limiting and in other examples internal components of the device may be enclosed by a housing lacking a cover, as shown in FIGS. 14A, 15A, and 15B, by a housing in combination with a single cover, as shown in FIGS. 7A and 7B, or any other suitable configuration.

Figure 9:
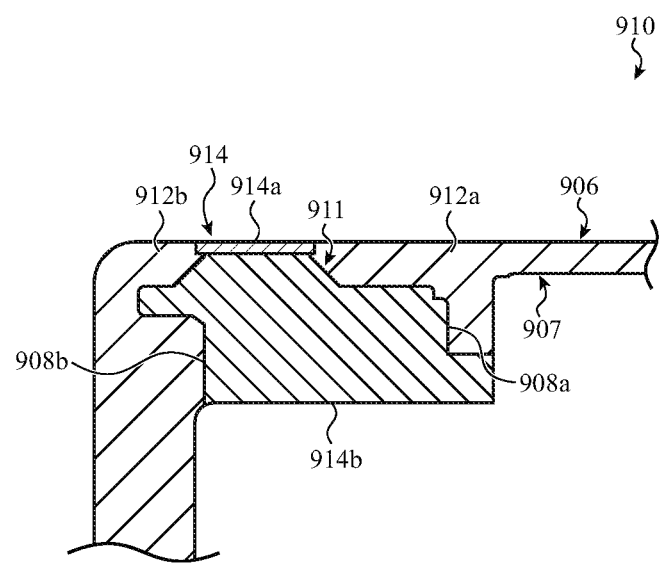
FIG. 9 shows another example cross-sectional view of the device of FIGS. 7A and 7B.

The housing 110 includes some housing components which include a thermoset composite material (e.g., 114b). In some cases, these housing components are formed from the thermoset composite material and in other cases these housing components are formed from multiple composite materials (as shown in the example of FIG. 9). The housing 110 also includes other housing components which are formed from a material other than the thermoset composite material (e.g., 112b and 112f). As examples, each of these other housing components may be formed from a metal, a glass, a glass-ceramic, a ceramic, and combinations thereof. The number of housing components shown in FIGS. 1A and 1B is not limiting, and in other examples a housing may include a lesser or a greater number of housing components.

In some cases, a housing component formed from a thermoset composite material (e.g., 114b) is coupled to one or more housing components formed from a material other than the thermoset composite material (e.g., 112b and 112f). As explained in more detail with respect to FIG. 16, a housing component comprising the thermoset composite material may be formed by curing a polymerizable mixture. For example, the polymerizable mixture may be introduced into a gap between two or more of the other housing components and then cured.

In some embodiments, a surface of the housing component formed from the material other than the thermoset composite material can be modified to improve its bonding with the thermoset composite material. The surface modification may enhance interaction between the surface and the thermoset polymer and/or its pre-polymers. For example, the surface of the housing component can be modified by one or more of mechanical texturing, chemical etching, anodization, use of a primer, and the like. The description of surface modifications provided with respect to FIGS. 2B and 2C is generally applicable herein and, for brevity, is not repeated here. In addition, the housing component comprising the thermoset composite material may be structurally interlocked with larger scale features of the housing component formed from the material other than the thermoset composite material These features may be referred to herein as retention features or interlock features. A variety of retention features are described herein including, but not limited to, those illustrated with respect to FIGS. 3, 5-6, 8-9, and 14B.

In some cases, the component including the thermoset composite material may provide a "window" for an internal device component configured to radiate (transmit) and/or receive electromagnetic signals. The thermoset composite material may be transmissive to wavelengths (or frequencies) of electromagnetic radiation transmitted and/or received by the internal device component. For example, the thermoset composite material may be an RF-transmissive material. In some cases, the thermoset composite material may be substantially transparent to one or more wavelengths (or frequencies) of the electromagnetic signal. For example, the thermoset composite material may transmit at least 50%, 60%, 70%, 80%, or 90% at a specified wavelength or frequency or over a specified range of wavelengths or frequencies. The internal device component may be an antenna and may be part of a wireless communication system. In some cases, the internal device component is configured to receive radio frequency (RF) signals. The frequency range may be from a "low band" frequency range (e.g., less than 1 GHz, such as about 400 MHz to less than 1 GHz, about 600 MHz to about 900 MHz, or 600 MHz to 700 MHz), a "mid-band" frequency range (e.g., about 1 GHz to about 6 GHz, such as about 1 GHz to about 2.6 GHz, about 2 GHz to about 2.6 GHz, about 2.5 GHz to about 3.5 GHz, or about 3.5 GHz to about GHz), or a "high-band" frequency range (e.g., about 24 GHz to about 40 GHz, about 57 GHz to about 64 GHz, or about 64 GHz to about 71 GHz). In addition, wireless charging ranges may broadly be from about 80 kHz to about 300 kHz or from about 110 kHz to about 205 kHz.

In some cases, the component including the thermoset composite material may be a dielectric component and dielectric properties of the component at a given frequency may be low enough that the component is substantially transparent to the electromagnetic signal. For example, the dielectric constant (relative permittivity) may be sufficiently low at a frequency range of interest to allow transmission of radio waves. In some cases, the thermoset composite material may have a dielectric constant (also referred to as the relative permittivity) of 2 to 4 or 2.5 to 3.5 at 2.5 GHz. The dissipation factor (also referred to as the loss tangent or tan delta) may be less than 0.5 or less than 0.4. In some cases, these parameters are measured per test method IEC-61189-2-721:2015. The component including the thermoset composite material, which may be a thermoset composite component, may have similar dielectric properties to the thermoset composite material.

In some cases, the dielectric component may provide at least some extent of electrical isolation between conducting housing components. For example, the dielectric strength may be sufficiently high to prevent or substantially limit electrical conduction through the dielectric component. Alternately or additionally, the dielectric strength may be sufficiently high to reduce capacitive coupling with an adjacent electrically conductive component. In some embodiments, at least one of these electrically conducting housing components is configured to operate as an antenna. For example, at least one of these conducting housing components may be configured to radiate electromagnetic radiation for a wireless communication system. The dielectric housing component may electrically isolate this antenna from an adjacent conducting housing component. In additional cases, the dielectric component may separate different regions of a conducting housing component, such as different regions surrounding an opening defined in the conducting housing component (e.g., an opening configured to operate as an emitter for a wireless communication system).

In some embodiments, the component may be predominantly made up of the thermoset composite material and may be referred to herein as a thermoset composite component. A thermoset composite component may also be referred to as being formed from the thermoset composite material. The thermoset composite material of the component includes a thermoset polymer, such as an epoxy-based polymer or a polyurethane-based polymer, which forms a crosslinked network. The thermoset composite material typically also includes inorganic particles, such as nano-sized inorganic particles. The inclusion of nano-sized inorganic particles in the thermoset composite material can increase the strength and the toughness of the thermoset composite material as compared to thermoset polymer alone. In addition, the inclusion of inorganic particles in the thermoset composite material can affect the dielectric constant of the thermoset composite material. The additional description of epoxy-based and polyurethane-based polymers provided with respect to FIG. 16 is generally applicable herein and, for brevity, is not repeated here.

The thermoset polymer typically forms a matrix for a reinforcement material. This matrix may also be referred to herein as a thermoset matrix. For example, the matrix may be an epoxy-based matrix, which may also be referred to as an epoxy matrix herein. The reinforcement material may be substantially dispersed within the matrix of the thermoset polymer. In some cases, the reinforcement material may be in the form of particles. For example, the particles may include nano-sized oxide particles (e.g., having a size from 1 nm to 100 nm). In some embodiments, the thermoset composite material includes nano-sized silica particles. Nano-sized ceramic particles, such as zirconia, alumina, and/or titanium dioxide particles may alternately or additionally be included the thermoset composite material. However, ceramics having a greater dielectric constant than silica may be less suitable when a substantially RF-transparent component is desired. The nano-sized oxide particles may be substantially non-magnetic. The loading of the nano-sized silica or ceramic particles may be from about 10 wt % to about 50 wt %. In additional embodiments, at least some of the particles may have a larger size, such as greater than 100 nm and less than 20 microns (micrometers). The additional description of nano-sized and larger sized silica and ceramic particles provided with respect to FIG. 16 is generally applicable herein and, for brevity, is not repeated here.

In some cases, the thermoset composite material includes one or more pigments which help to impart a durable color to the thermoset composite component. In some cases, the particles of the pigment may be micro-sized or nano-sized. As examples, the pigment may be an inorganic pigment, a carbon pigment, an organic pigment, or combinations thereof. The additional description of pigments provided with respect to FIG. 16 is generally applicable herein and, for brevity, is not repeated here.

In some embodiments, the component including the thermoset composite material is a structural component of the housing. A structural housing component including a thermoset composite material may have an ability to resist deformation without being overly brittle. The strength of a thermoset housing component may be indicated by one or more mechanical properties of the thermoset composite material, such as the hardness, the elastic modulus, or the fracture strength of the thermoset composite material. For example, the thermoset composite material may have a hardness from 60 to 100 or from 70 to 95 on the Shore D hardness scale. As an additional example, the thermoset composite material may have a fracture strength (ultimate tensile strength UTS) of from 30 MPa to 50 MPa or from 30 MPa to 40 MPa. In some cases, the tensile strength is measured per ASTM D638 with Type IV dogbone sample.

The ductility and the toughness of the thermoset composite component may be indicated by one or more additional mechanical properties of the thermoset composite material. For example, the ductility of the thermoset composite material may be indicated by the percent elongation or by the impact strength of the material. In some cases, the percent elongation of the material is from 10% to 15%. The impact strength may be measured using a notched-bar impact test, such as an Izod impact test. In some cases, the impact strength of the thermoset composite material is from 40 J/m to 90 J/m or from 50 J/m to 90 J/m as measured by an Izod impact test. In some cases, the impact strength is measured with per ASTM D256. In some examples, the mechanical property is measured at room temperature. In some cases, a mechanical property may be measured directly on the thermoset composite component while in other cases the mechanical property may be measured on a sample of the thermoset composite material cured to about the same degree of crosslinking.

The thermoset composite component may also be configured to have one or more other properties. For example, a structural housing component may have a glass transition temperature of 60° C. to 90° C., 65° C. to 85° C., or 70° C. to 80° C. The thermoset composite component may also have a shrinkage less than 8% or less than 5%. In some cases, these other properties may be measured directly on the thermoset composite component while in other cases the property may be measured on a sample of the thermoset composite material cured to about the same degree of crosslinking.

As previously mentioned, a housing component including a thermoset composite material may be bonded to one or more other housing components to provide structural integrity to the housing. In some embodiments, the bonding between these components includes adhesive bonding. In some cases, the bonding between the thermoset composite material and the material of the adjoining housing component is indicated by the lap shear strength between the thermoset composite material and the material of the adjoining housing component. In some cases, the lap shear strength is greater than 20 MPa or greater than 25 MPa as measured using a single lap test. In some cases, the lap shear strength is greater than 20 MPa and up to 50 MPa or greater than 25 MPa and up to 50 MPa. In some cases, the lap shear strength may be measured per ASTM D1002. In some cases, the bonding may be measured directly on the thermoset composite component while in other cases the mechanical property may be measured on a sample of the thermoset composite material cured to about the same degree of crosslinking.

The housing 110 of FIGS. 1A and 1B includes multiple housing components (112a through 112f and 114a through 114f), each of the housing components defining a respective portion of an exterior surface of the housing. In addition, the housing 110 defines a side surface 106 of the electronic device. The housing component 114f is located between the housing components 112c and 112d and is not visible in the views of FIGS. 1A and 1B.

In the example of FIGS. 1A and 1B, the housing 110 includes six housing components including the thermoset composite material. In some cases, each of these six housing components is a dielectric housing component. In the example of FIGS. 1A and 1B, each of the housing components 114a, 114b, 114c, 114d, 114e, and 114f include a thermoset composite material. In some cases, one or more of the housing components 114a through 114f are formed from a thermoset composite material (and are predominantly made up of the thermoset composite material). In some cases, each of the housing components 114a through 114f is formed from substantially the same thermoset composite material. In other cases, one or more of the housing components 114a through 114f are formed from thermoset composite material including reinforcing particles in combination with thermoset composite material including the fibers as shown and described with respect to FIG. 9. The description provided with respect to FIG. 9 is generally applicable herein and is not repeated here.

The housing 110 also includes six housing components formed from a material other than the thermoset composite material. In FIGS. 1A and 1B, each of the housing components 112a, 112b, 112c, 112d, 112e, and 112f are formed from a material other than the thermoset composite material. As examples, each of the housing components 112a through 112f may be formed from a metal, a glass, a glass-ceramic, a ceramic, and the like. In some cases, one or more of the housing components 112a through 112f is electrically conductive (also simply referred to as conductive). By the way of example, a housing component formed from a metal (also referred to as a metal material) may be formed from an aluminum alloy, steel, a titanium alloy, a magnesium alloy, or similar materials. A housing component formed from a glass and/or a glass ceramic (also referred to as a glass and/or glass ceramic material) may be formed from an aluminosilicate glass and/or glass ceramic. A housing component formed from a ceramic (also referred to as a ceramic material) may be formed from alumina (e.g., polycrystalline alumina or sapphire), zirconia, another metal oxide, a metal carbide, a metal boride, a metal nitride, a metal silicide, and the like. In some cases, each of the housing components 112a through 112f is formed from substantially the same material. As referred to herein, a housing component formed from a particular material, such as a metal, may also include a relatively thin coating of a different material along one or more surfaces, such as an anodization layer, a physical vapor deposited coating, a paint coating, a primer coating (which may include a coupling agent), or the like. In some cases, one or more openings may be formed in the housing 110, such as the openings 135 and 136 formed in the component 112b. As examples, such an opening may be provided over a speaker or a microphone, may surround a button or other type of input device, or may allow access to a charging port.

In some cases, a housing component including a thermoset composite material partially or completely fills a gap between adjacent two housing components formed from a material other than the thermoset composite material. For example, the housing component 114b may partially or completely fill a gap between the adjacent housing components 112b and 112f. In some cases, the housing component including a thermoset composite material (e.g., 114b) mechanically or structurally couples two adjacent housing components (e.g., 112b and 112f).

In some embodiments, the housing 110 includes multiple electrically conductive housing components and multiple dielectric housing components which include the thermoset composite material. For example, the housing components 112a through 112f may be formed from a metal material (e.g., a metal alloy) and the housing components 114a through 114f may be formed of the thermoset composite material. In some cases, at least one of the housing components formed from the electrically conductive material is configured to operate as an antenna. For example, at least one of the two electrically conducting housing components may be configured to radiate electromagnetic radiation for a wireless communication system. The dielectric housing component including the thermoset composite material may electrically isolate this antenna from an adjacent electrically conducting housing component.

The front cover 122 may be positioned over a display 142 and may provide a window through which the display may be viewed. In some cases, the display 142 is a touch-sensitive display. The display 142 may be a liquid-crystal display (LCD), a light-emitting diode (LED) display, an LED-backlit LCD display, an organic light-emitting diode (OLED) display, an active layer organic light-emitting diode (AMOLED) display, and the like. In some embodiments, the display 142 may be attached to (or abut) the front cover 122. The front cover 122 may at least partially define a front surface 102 of the electronic device. An opening 134 may be provided in the front cover 122 and in some cases may provide a speaker port. The device 100 may also include a front-facing camera 132.

The exterior surface of the rear cover 124 may at least partially define a rear surface 104 of the electronic device. In the example of FIG. 1B, the rear cover may include a thicker region 144 which accommodates one or more optical modules 156 of a camera assembly. The thicker region 144 may be integrally formed with the surrounding portion of the rear cover or may be provided by a separate cover piece which is coupled to the surrounding portion of the rear cover (e.g., by a coupling ring).

The electronic device 100 further includes a camera assembly which in turn includes the one or more optical modules 156. The camera assembly may define any number of optical modules such as one, two, three, four, five, or six optical modules. The optical modules may include, but are not limited to, a camera module, an illumination module, a sensor, and combinations thereof. When the camera assembly includes multiple camera modules, each of the camera modules may have a different field of view or other optical property. In some cases, a camera module includes an optical sensor array and/or an optical component such as a lens, filter, or window. In additional cases, a camera module includes an optical sensor array, an optical component, and a camera module housing surrounding the optical sensor array and the optical components. The camera module may also include a focusing assembly. For example, a focusing assembly may include an actuator for moving a lens of the camera module. In some cases, the optical sensor array may be a complementary metal-oxide semiconductor (CMOS) array or the like. In some cases, the camera assembly may include one or more sensors such as a depth measuring sensor (e.g., a time of flight sensor), an ambient light sensor, an infrared sensor, an ultraviolet light sensor, a health monitoring sensor, a biometric sensor (e.g., a fingerprint sensor) or the like.

Typical covers described herein are thin, and typically include a cover member that is less than 5 mm in thickness, and more typically less than 3 mm in thickness, less than or equal to 2 mm in thickness, or less than or equal to 1 mm in thickness. The front cover 122 and the rear cover 124 may be coupled to the housing 110. For example, each of the front cover 122 and the rear cover 124 may be coupled to the housing with an adhesive, a fastener, an engagement feature, or a combination thereof.

Each of the front cover 122 and the rear cover 124 typically includes a cover member which may be a glass member, a glass ceramic member, or a member comprising one or more glass portions and one or more glass ceramic portions. The cover member may be chemically strengthened by ion exchange. In some cases, a cover may include multiple layers, each layer selected from a glass layer, a glass ceramic layer, and a polymer layer. A cover such as the front cover 122 and the rear cover 124 may further include one or more coatings. For example, the cover may include an exterior coating such as an oleophobic coating and/or an anti-reflective coating. Alternately or additionally, the cover may also include an interior coating such as a masking layer.

Figure 18:
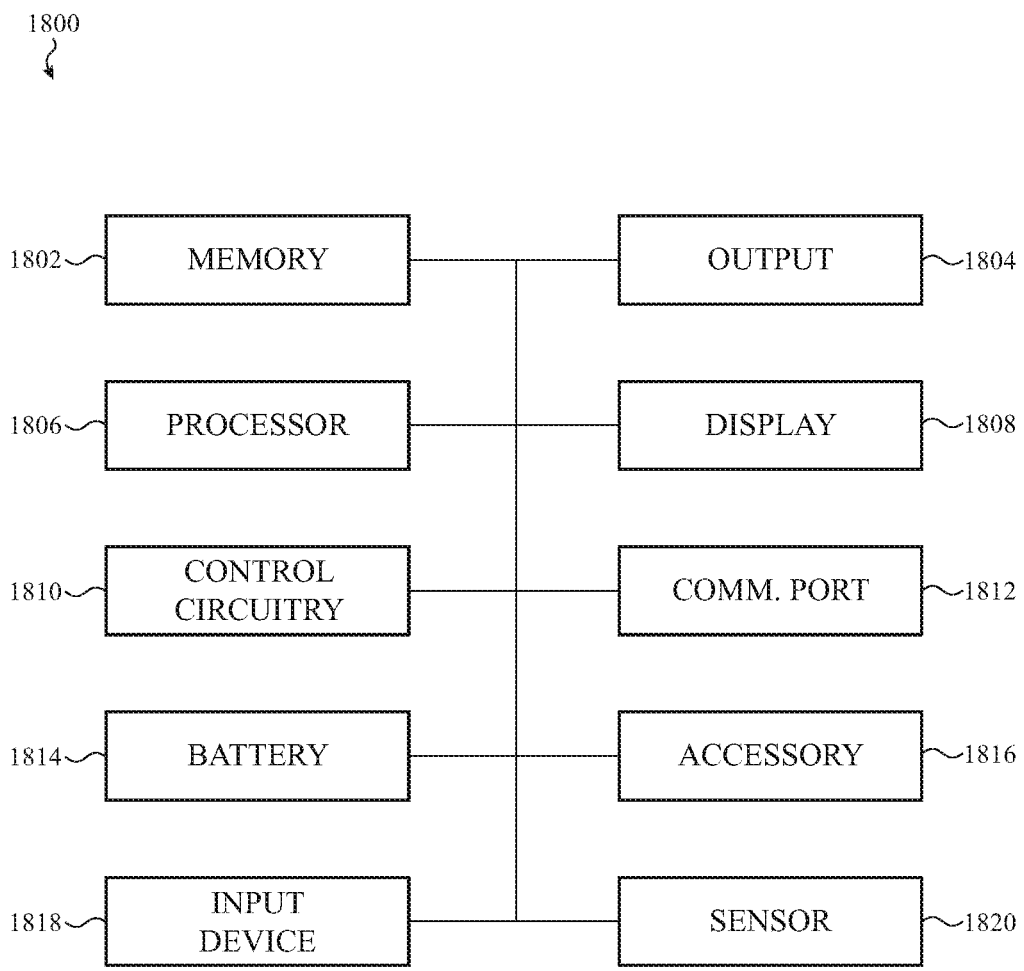
FIG. 18 shows a block diagram of a sample electronic device that can incorporate a component including a thermoset composite material.

In addition to a display and a camera assembly, the electronic device 100 may include additional components. These additional components may comprise one or more of a processing unit, control circuitry, memory, an input/output device, a power source (e.g., battery), a charging assembly (e.g., a wireless charging assembly), a network communication interface, an accessory, and a sensor. Components of a sample electronic device are discussed in more detail below with respect to FIG. 18 and the description provided with respect to FIG. 18 is generally applicable herein.

Figure 2A:
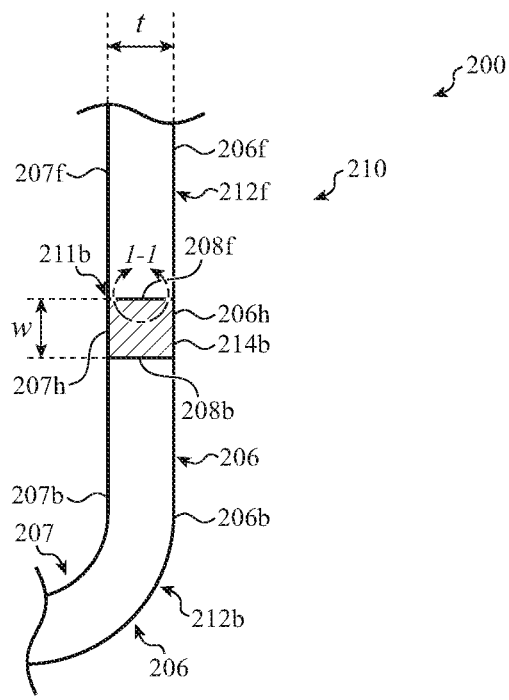
FIGS. 2A, 2B, 2C, and 2D show examples of cross-sectional views of the device of FIGS. 1A-1B.
Figure 2B:
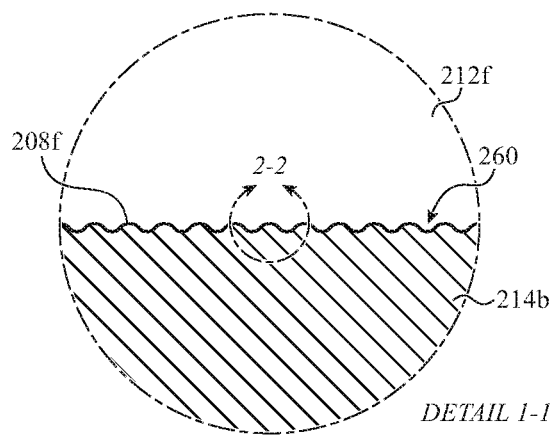
Figure 2C:
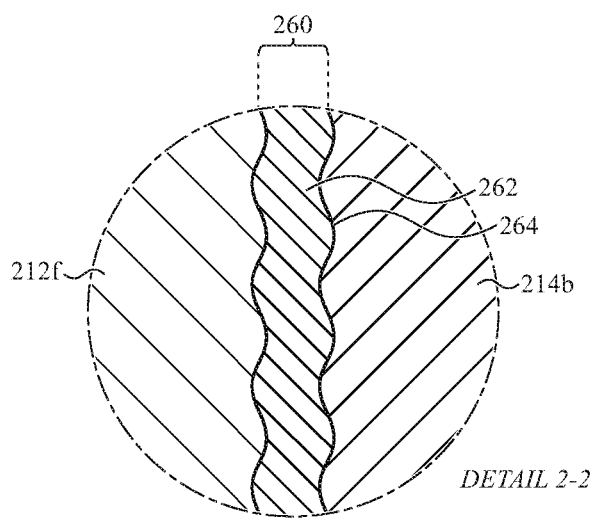

FIG. 2A shows an example of a partial cross-sectional view of an electronic device 200. In particular, FIG. 2A shows an example of a housing 210. The housing 210 includes a housing component 214b including a thermoset composite material. The housing component 214b is positioned between two housing components 212b, 212f which are formed from a material other than the thermoset composite material. The cross-section through the housing 210 may be an example of a lateral cross-section through the housing 110 along A-A in FIG. 1A. The housing components 212b, 212f, and 214b may be similar in composition, physical properties, electrical properties, and other properties to the housing components 112b, 112f, and 114b respectively and, for brevity, that description is not repeated here.

In the example of FIG. 2A, the housing component 214b including the thermoset composite material substantially fills a gap 211b between two adjacent housing components 212b, 212f. In some cases, the housing component 214b is formed from the thermoset composite material and the housing components 212b, 212f are formed from a material other than the thermoset composite material. In embodiments, the housing component 214b structurally couples the two adjacent housing components 212b and 212f. The housing component 214b defines a portion 206h of the exterior surface 206 of the housing and a portion 207h of the interior surface 207 of the housing.

As shown in FIG. 2A, the housing component 212b defines a portion 206b of the exterior surface 206 of the housing and a surface 208b extending inward from the portion 206b of the exterior surface 206 towards the interior surface 207b of the electronic device. Similarly, the housing component 212f defines a portion 206f of the exterior surface 206 and a surface 208f extending inward from the portion 206f of the exterior surface 206 towards the interior surface 207f of the electronic device. The exterior surface 206 may be a side surface of the electronic device. The gap 211b is defined between the surfaces 208b and 208f. The surfaces 208b and 208f may also be referred to herein as bonding surfaces.

FIG. 2A shows the width (w) of the gap and the thickness (t) of the gap. In some examples, the width of the gap may be from about 40 microns to about 300 microns, from about 100 microns to about 500 microns, from about 500 microns to about 2 mm, from about 1 mm to about 5 mm, or from about 5 mm to about 1 cm. The thickness (which may also be referred to as the depth) of the gap may be about 250 microns to about 2 mm, from about 250 microns to about 1 mm, from about 500 microns to about 1.5 microns, or from about 1 mm to about 5 mm.

Figure 8:
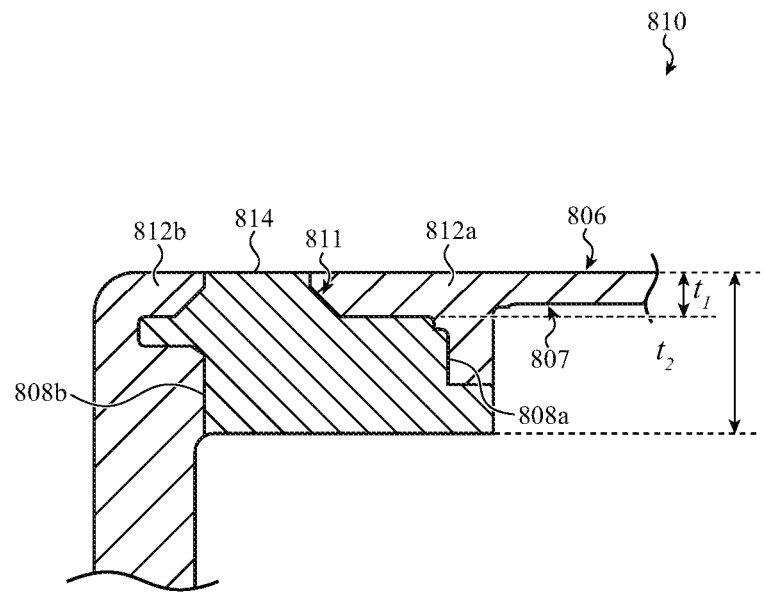
FIG. 8 shows an example cross-sectional view of the device of FIGS. 7A and 7B.
Figure 15C:
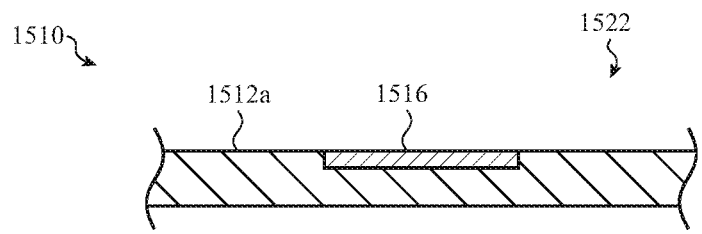

In the example of FIG. 2A, the thickness of the gap is about the same as a thickness of the housing component 214b and also is about the same as a thickness of the housing components 212b and 212f. In some cases, the portions 206b, 206f, and 206h are substantially flush with one another, which can be achieved at least in part by co-machining the housing component 214b and the housing components 212b and 212f. In additional examples, the depth of the gap is less than a thickness of the housing component, as shown in FIG. 15C. In further examples, a thickness of the housing component including a thermoset composite material (as measured from its exterior surface) may be greater than a thickness of the adjacent housing components, as shown in FIGS. 8 and 9.

The housing 210 may also be described as defining a side wall (or "sidewall") of the electronic device, the housing component 212b defining a first portion of the side wall, and the housing component 212f defining a second portion of the side wall. The surface 208b may also be described as being defined by an end of the housing component 212b and the surface 208f described as being defined by an end of the housing component 212f.

In some examples, the housing component 214b is formed from a thermoset composite material. The housing component 214b may therefore be referred as a thermoset composite housing component. The housing component 214b may be a dielectric housing component. The thermoset composite material may be as previously described with respect to FIGS. 1A to 1B and, for brevity, that description is not repeated here. However, this example is not limiting and in other examples only a portion of the housing component may be formed from the thermoset composite material. In particular, FIG. 9 shows an example of a housing component formed from two different materials, such as a first thermoset composite material including particulate reinforcements and a second thermoset composite material including fibrous reinforcements.

Each of the housing components 212b and 212f are formed from a material other than the thermoset composite material. In some examples, each of the housing components 212b and 212f are formed from a metal, a glass, a glass-ceramic, a ceramic, or a combination of these materials. In some cases, the housing component 214b may be configured to be a window for an RF component positioned within the housing, such as when the housing component 214b is substantially transparent to RF and when the housing components 212b and 212f are formed from a metal or a ceramic having a high dielectric constant (e.g., zirconia). In additional cases, the housing component 214b may be configured to electrically isolate housing components 212b and 212f, such as when both of housing components 212b and 212f are formed from a metal and at least one of 212b and 212f is configured to operate as an antenna. For example, at least one of the two metal housing components 212b and 212f may be configured to radiate electromagnetic radiation for a wireless communication system.

FIG. 2B shows an example of a detail view of the area 1-1 of the housing 210 of FIG. 2A. In particular, FIG. 2B shows an interface region 260 between the housing component 214b and the housing component 212f. As previously described, the housing component 214b may be formed from the thermoset composite material and the housing component 212f may be formed from a material other than the thermoset composite material. The interface region 260 includes the surface 208f defined by the housing component 212f. As shown in FIG. 2B, the surface 208f defines a texture. As described in more detail with respect to FIG. 16, the surface 208f may be textured by various methods including mechanical texturing and/or chemical etching. The texture may be described as defining a plurality of texture features, such as peaks and valleys. In some embodiments, the root mean square height of the texture is from 0.5 microns to 2 microns, from 250 nm to 1 micron, or from 125 nm to 750 nm. In some cases, the polymerizable mixture which is cured to form the thermoset composite material can at least partially conform to the texture of the surface 208f. When the polymerizable mixture is cured, the conforming of the thermoset composite material to the texture can create mechanical interlocks on the scale of the texture (e.g., micro-scale or smaller). In additional embodiments the surface 208f may define a smooth texture having a lower root mean square height (e.g., less than 125 nm) obtained through a polishing operation.

FIG. 2C shows an example of detail view of the area 2-2 of FIG. 2B. In the example of FIG. 2C, the interface region 260 further includes an anodization layer 262. When the housing component 212f is formed from a metal material, electrochemical oxidation of the metal material can produce an anodization layer 262. The anodization layer is formed from a metal oxide and is typically thicker than a native oxide layer formed on the metal material. For example, an aluminum oxide layer may be formed on an aluminum alloy through anodization. For example, the anodization layer may have an average thickness from about 250 nm to about 2 microns or from about 500 nm to about 1.25 microns. In some cases, the anodization layer 262 may be porous. For example, the pores may have an average diameter from about 10 nm to about 100 nm or from about 25 nm to about 75 nm. In some cases, the polymerizable mixture which is cured to form the thermoset composite material can at least partially enter the pores of the anodization layer. When the polymerizable mixture is cured, the thermoset composite material within the pores may form a nano-scale (also referred to as nano-sized) mechanical interlock. In some examples, the component extends into a first set of nano-sized pores of a first anodization layer on a surface of a first housing component and into a second set of nano-sized pores of a second anodization layer on a surface of a second housing component. In additional examples, a sol-gel coating may be formed on the surface of the housing component; the sol-gel coating may include a silicon or metal oxide.

As shown in the example of FIG. 2C, the interface region 260 may further include a primer 264. In some cases, the primer may include a coupling agent. The coupling agent may be configured to interact with both the anodization layer 262 and the thermoset composite material. In some cases, the coupling agent may be silane-based. For example, the coupling agent may be derived from an alkoxy silane such as a dialkoxy or trialkoxy silane. The alkoxy silane may be capable of interacting with the metal oxide, such as the metal oxide of the anodization layer 262. The alkoxy silane may also include a functional group capable of interacting with one or more components of the polymerizable mixture. For example, the alkoxy silane may include an epoxy group when the thermoset composite material is epoxy-based. When the interface region includes a porous anodization layer, the coupling agent 264 may enter the pores of the anodization layer. However, some of the coupling agent 264 may remain on the surface of the anodization layer as illustrated in FIG. 2C. In additional examples a coupling agent may be used in the absence of an anodization layer and the coupling agent may be capable of interacting with a native oxide layer on the metal or with a sol-gel coating formed on the metal.

Alternatively, the interface region may include a primer which is free of a coupling agent. For example, the primer may be derived from a polymerizable mixture different from that used to form the thermoset composite material. In some cases, an epoxy-based primer may be used for both epoxy-based and polyurethane-based thermoset composite materials.

Figure 2D:
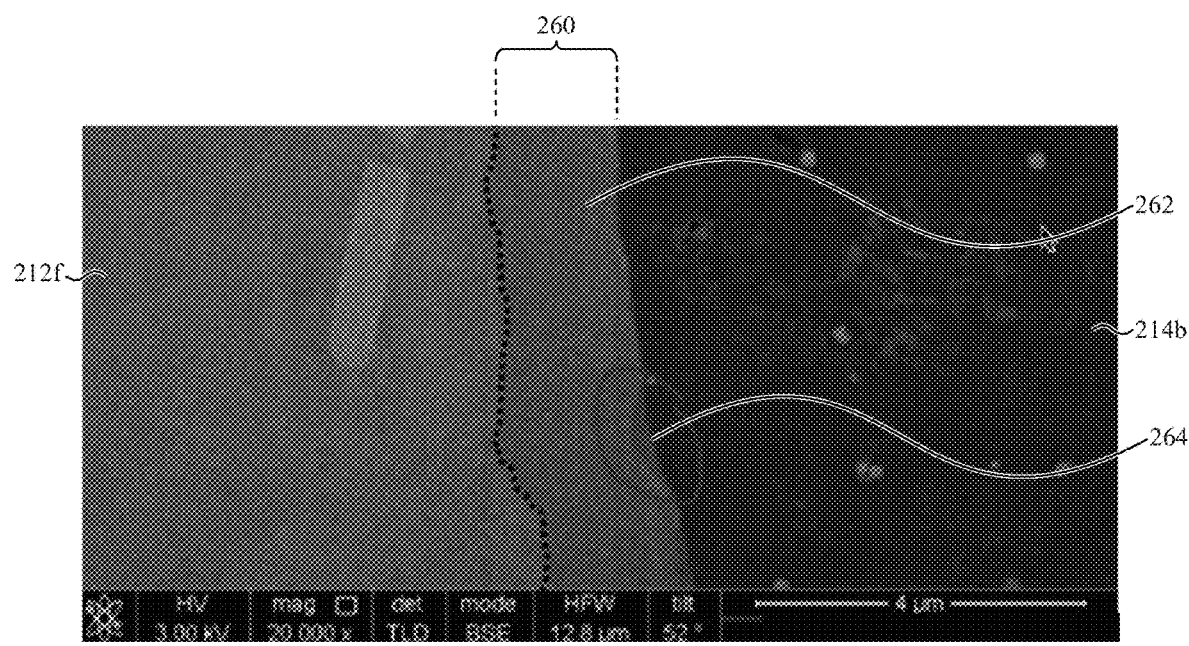

FIG. 2D is an example of a scanning electron microscope image showing an interface region 260 between an aluminum alloy housing component 212f and an epoxy-based composite component 214b. The dotted line in FIG. 2D has been added to generally indicate the position of an interface between the aluminum alloy housing component 212f and an anodization layer 262 formed on the aluminum alloy housing component 212f. A region of primer 264 is visible at an interface between the anodization layer 262 and the epoxy-based composite component 214b (this region is circled in FIG. 2D). The anodization layer is porous, with the nano-scale pore diameters. The image of FIG. 2D is a back-scattered electron image of a cross-section through the interface region 260.

Figure 3:
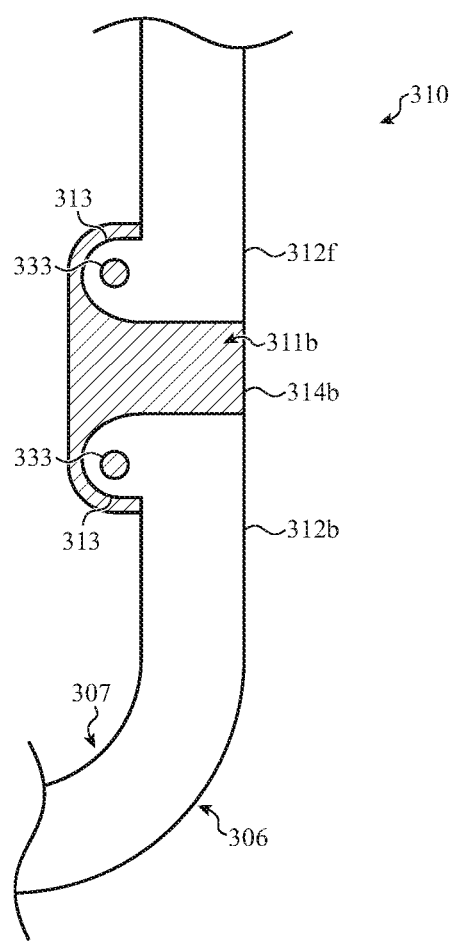
FIG. 3 shows another example of a cross-sectional view of the device of FIGS. 1A-1B.

FIG. 3 shows another example of a cross-sectional view of the device of FIGS. 1A-1B. In particular, FIG. 3 shows another example of a housing 310. The housing 310 includes a housing component 314b including a thermoset composite material positioned between two housing components 312b, 312f which are formed from a material other than the thermoset composite material. In some cases, the housing component 314b may be formed from the thermoset composite material. The cross-section through the housing 310 may be another example of a lateral cross-section through the housing 110 along A-A in FIG. 1A. The housing components 312b, 312f, and 314b may be similar in composition, physical properties, electrical properties, and other properties to the housing components 112b, 112f, and 114b and, for brevity, that description is not repeated here.

In the example of FIG. 3, each of the housing components 312b and 312f includes a retention feature 313. The retention features 313 can structurally interlock with the housing component 314b and thus help mechanically retain the housing component 314b within the gap 311b (formed between the housing components 312b and 312f). In the example of FIG. 3, each of the retention features 313 defines a protrusion from an internal surface 307 of the housing 310, the protrusion extending into the interior volume of the electronic device. The housing component 314b extends around the retention features 313 and, in some cases, may encapsulate the retention features 313. As shown in FIG. 3, the retention features 313 define a hole 333 which extends through or partially through the protrusion and the housing component 314b may extend into the hole 333. For example, the hole 333 may be oriented perpendicular to the plane of FIG. 3, parallel to the plane of FIG. 3, or at an intermediate angle. The example of FIG. 3 is not limiting, and retention features may take a variety of forms, including depressions or grooves in a surface extending inward from the external surface (as shown in FIGS. 5-6, 8-9, and 14B), an internal angle (as shown in FIGS. 6 and 8-9), protrusions which lack a hole such as 333, and the like.

In some cases, a retention feature along a bonding surface is larger than the features produced by the surface modification techniques previously described (e.g., texture or pores). The retention feature may be created by a machining technique, a molding technique, another forming technique, or by combinations of forming techniques. In some cases, a retention feature may be used in combination with one or more of housing component surface modification techniques. As previously discussed, these surface modification techniques include, but are not limited to, mechanical texturing, chemical etching, anodization, use of a primer, and the like.

Figure 4:
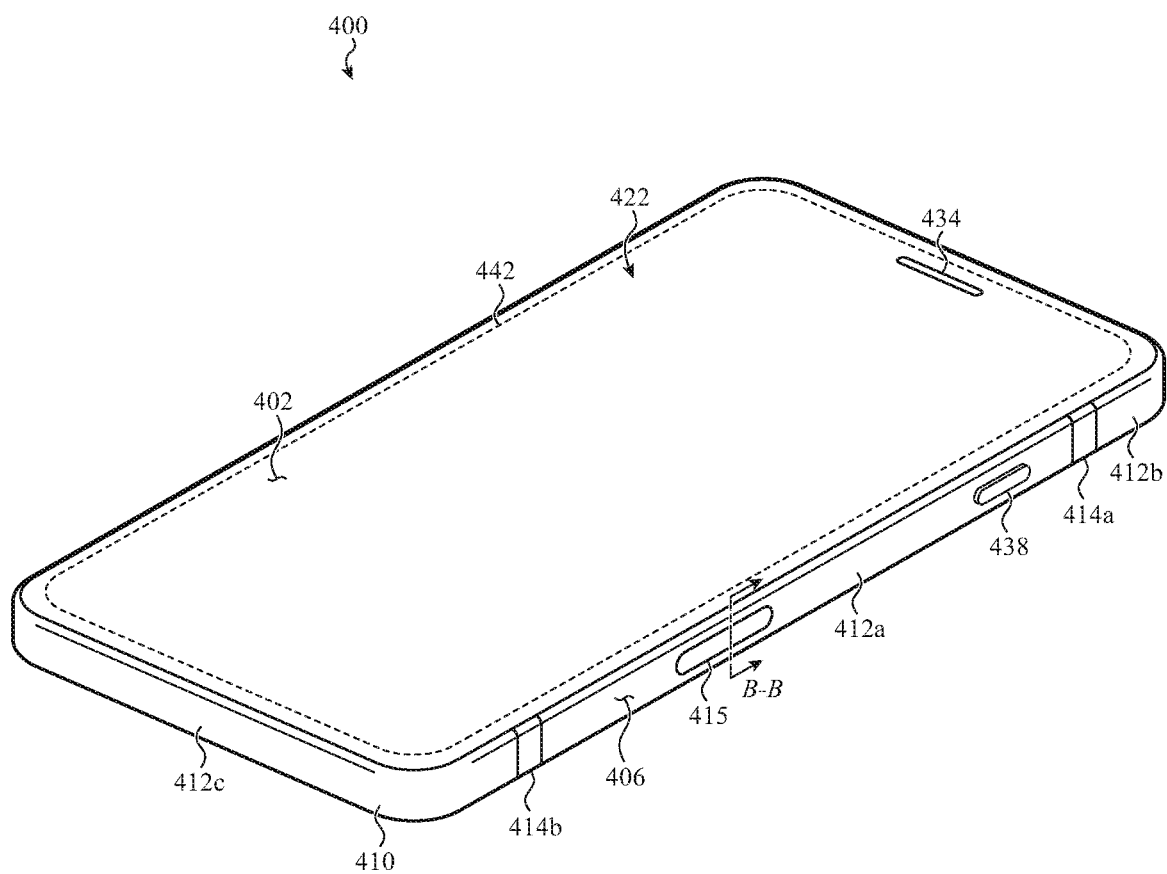
FIG. 4 shows another example electronic device.

FIG. 4 shows another example electronic device. In the example of FIG. 4, the device 400 includes a housing 410 and a front cover 422. In some cases, the device further includes a rear cover. The housing 410 and the front cover 422 may be part of an enclosure which encloses internal components of the electronic device.

The housing 410 includes some housing components which include a thermoset composite material (e.g., 414a, 414b, and 415) and other housing components which are formed from a material other than the thermoset composite material (e.g., 412a, 412b, and 412c). In some cases, one or more of the housing components 414a, 414b, and 415 may be formed from the thermoset composite material. The housing components 414a, 414b, and 415 may be similar in composition, physical properties, electrical properties, and other properties to the housing component 114b and, for brevity, that description is not repeated here. In addition, the housing components 412a, 412b, and 412c may be similar in composition, physical properties, electrical properties, and other properties to the housing components 112b and 112f and, for brevity, that description is not repeated here.

Figure 5:
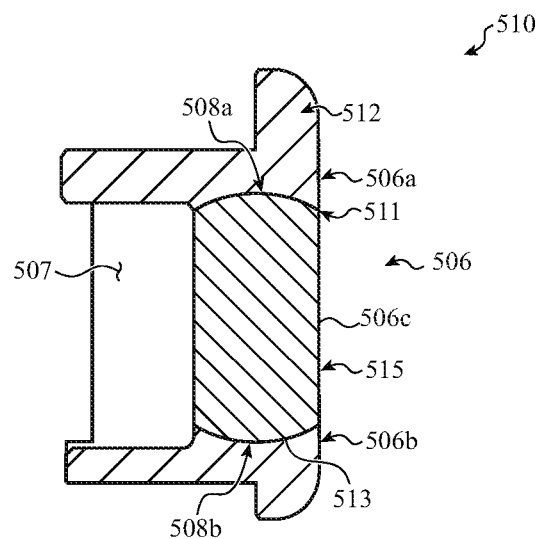
FIG. 5 shows an example cross-sectional view of the device of FIG. 4.
Figure 6:
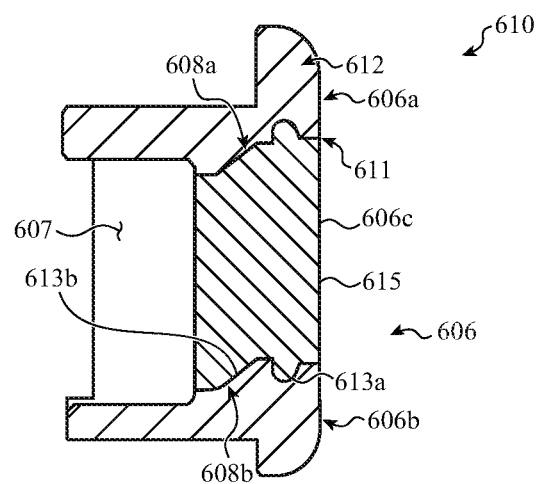
FIG. 6 shows another example cross-sectional view of the device of FIG. 4.

In the example of FIG. 4, the housing component 412a defines an opening (e.g., 511 as shown in the cross-section view of FIG. 5). In the example of FIG. 4, the opening has the form of a slot along the side surface 406. The housing component 415 including the thermoset composite material is positioned within the opening and bonded to the housing component 412a. The housing 410 may at least partially surround an emitter, a receiver, and/or a transceiver. When the housing component 412a is formed from an electrically conducting material, the housing component 415 may provide a "window" for the emitter, receiver, and/or transceiver. In some cases, the housing component 415 may provide a window for a millimeter wave antenna that is configured to conduct 5G communications. For example, the antenna may have a 24 GHz to 39 GHz frequency band or a 60 GHz frequency band (e.g., 57-64 GHz or 64-71 GHz). In addition, the housing component 415 may define a portion of a waveguide or allow for beam-forming or beam directing functionality. In additional embodiments, the opening may be configured to operate as an emitter for a wireless communication system and the housing component 412a may be operably coupled to wireless transmission circuitry. The electronic device 400 also includes an input device 438, which may have the form of a button.

The housing component 412a may also be described as having a wall which defines at least a portion of the opening (e.g., the wall defining the surfaces 508a and 508b as shown in the cross-section view of FIG. 5). The surface(s) of the wall may be modified by one or more of mechanical texturing, chemical etching, anodization, use of a primer, and the like as previously described with respect to FIGS. 2A-2C. In some cases, the wall is textured. For example, a textured wall of a housing component formed from a metal may result from forming texture features into the metal, by forming a coating having a texture on or into the metal, or by combinations thereof. In addition, the housing component 412a may include a retention feature as previously described with respect to FIG. 3. For brevity, the description previously provided with respect to FIGS. 2A-2C and 3 is not repeated here.

In addition, the housing component 414a including a thermoset composite material may mechanically or structurally couple the housing components 412a and 412b and the housing component 414b may mechanically or structurally couple the housing components 412a and 412c. As previously discussed with respect to FIGS. 1A and 1B, the housing components 414a and 414b may provide windows for an emitter, a receiver, and/or a transceiver internal to the electronic device or may electrically isolate adjacent electrically conductive components (at least one of which may be configured to operate as an antenna). For brevity, the description previously provided with respect to FIGS. 1A and 1B is not repeated here.

The front cover 422 may be positioned over a display 442 and may provide a window through which the display may be viewed. In some embodiments, the display 442 may be attached to (or abut) the front cover 422. The front cover 422 may define a front surface 402 of the electronic device. The front cover 422 may be similar to the front cover 122 and, for brevity, that description is not repeated here. An opening 434 may be provided in the front cover 422 and in some cases may provide a speaker port.

FIG. 5 shows an example of a cross-sectional view of the electronic device 400 of FIG. 4. In particular, FIG. 5 shows an example of a housing 510. The housing 510 includes a housing component 515 including a thermoset composite material positioned in an opening 511 of the housing component 512 which is formed from a material other than the thermoset composite material. The cross-section through the housing 510 may be an example of a vertical cross-section through the housing 410 along B-B in FIG. 4. The housing component 515 may be similar in composition, physical properties, electrical properties, and other properties to the housing component 114b and the housing component 512 may be similar in composition, physical properties, electrical properties, and other properties to the housing components 112a and 112f and, for brevity, that description is not repeated here.

In the example of FIG. 5, the housing component 515 including the thermoset composite material substantially fills an opening 511 in a housing component 512 which is formed from a material other than the thermoset composite material. In some cases, the housing component 515 may be formed from the thermoset composite material. In embodiments, the housing component 515 is a dielectric housing component and the housing component 512 is an electrically conductive housing component. In embodiments, the housing component 515 is a structural component of the housing 510. The housing component 512 defines portions 506a and 506b and the housing component 515 defines a portion 506c of the exterior surface 506 of the housing. The exterior surface 506 may be a side surface of the electronic device, as shown in FIG. 4.

As shown in FIG. 5, the housing component 512 also defines a surface 508a extending inward from the portion 506a of the exterior surface 506 towards the interior surface 507. In addition, the housing component 512 defines a surface 508b extending inward from the portion 506b of the exterior surface 506, towards the interior surface 507. The opening is defined at least in part between the surfaces 508a and 508b, which generally face each other. The housing component 515 is bonded to the surfaces 508a and 508b, which may also be referred to herein as bonding surfaces. The surface(s) 508a and 508b may be modified by one or more of mechanical texturing, chemical etching, anodization, use of a primer, and the like as previously described with respect to FIGS. 2A-2C.

In the example of FIG. 5 the housing component also defines retention features 513 along the surfaces 508a and 508b. In particular, the retention features 513 define a curved depression along the surfaces 508a and 508b, which may also be referred to herein as an undercut. In the example of FIG. 5, the depression extends along the length of the surfaces 508a and 508b (and the depth of the opening 511). However, this example is not limiting and in other examples the depression may extend along a lesser portion of the surfaces 508a and 508b (as shown in FIG. 6) and/or may have a different shape.

FIG. 6 shows an additional example of a cross-sectional view of the electronic device 400 of FIG. 4. In particular, FIG. 6 shows an example of a housing 610. The housing 610 includes a housing component 615 including a thermoset composite material positioned in an opening 611 of a housing component 612 which is formed from a material other than the thermoset composite material. The cross-section through the housing 610 may be another example of a vertical cross-section through the housing 410 along B-B in FIG. 4. The housing component 615 may be similar in composition, physical properties, electrical properties, and other properties to the housing component 114b and the housing component 612 may be similar in composition, physical properties, electrical properties, and other properties to the housing components 112b and 112f and, for brevity, that description is not repeated here.

In the example of FIG. 6, the housing component 615 including the thermoset composite material substantially fills an opening 611 in a housing component 612 which is formed from a material other than the thermoset composite material. In some cases, the housing component 615 may be formed from the thermoset composite material. In embodiments, the housing component 615 is a dielectric housing component and the housing component 612 is an electrically conductive housing component. In embodiments, the housing component 615 is a structural component of the housing 610. In a similar fashion as previously described for FIG. 5, the housing component 612 may define first and second portions 606a, 606b and the housing component 615 may define a third portion 606c of the exterior surface 606 of the housing. The exterior surface 606 may be a side surface of the electronic device, as shown in FIG. 4.

As shown in FIG. 6, the housing component 612 also defines a surface 608a and a surface 608b, which generally face each other. The opening 611 is defined at least in part between the surfaces 608a and 608b. The housing component 615 is bonded to the surfaces 608a and 608b, which may also be referred to herein as bonding surfaces. The surface(s) 608a and 608b may be modified by one or more of mechanical texturing, chemical etching, anodization, use of a primer, and the like as previously described with respect to FIGS. 2A-2C.

In the example of FIG. 6 the housing component 612 also defines retention features 613a and 613b along the surfaces 608a and 608b. In particular, the retention features 613a and 613b each define a curved depression in the surfaces 608a and 608b. The retention features 613a and 613b may also be characterized as an "undercut." The retention features 613a and 613b each define an angled portion of the surfaces 608a and 608b. In the example of FIG. 6, the angled portion defined by retention feature 613b forms an angle having a magnitude greater than zero and less than ninety degrees with respect to an adjacent portion of the surface (and a line perpendicular to 606c). As a result, the portion of the component 615 defining an interior surface 607 of the housing is offset with respect to the portion of the component 615 which defines the portion 606c of the exterior surface 606. However, this example is not limiting and in other examples an angled portion may define an angle having a magnitude greater than zero and less than or equal to ninety degrees or greater than or equal to ninety degrees and less than one hundred eighty degrees.

FIGS. 7A and 7B show views of an additional example electronic device. In the example of FIGS. 7A and 7B, the device 700 includes a housing 710 and a front cover 722. The housing 710 and the front cover 722 may be part of an enclosure which encloses internal components of the electronic device. In the example of FIGS. 7A and 7B, the dimensions and form factor, including the ratio of the length of its long sides to the length of its short sides, correspond to those of a tablet computing device.

In the example of FIGS. 7A and 7B, the housing 710 includes housing components which include a thermoset composite material (e.g., 714 and 715). In some cases, the housing components 714 and 715 are formed from the thermoset composite material and may be referred to as thermoset composite housing components. One or more other housing components are formed from a material other than the thermoset composite material (e.g., one or more housing components defining the housing portions 712a, 712b, 712c, and 712d). In embodiments, the housing components 714 and 715 are dielectric housing components and the one or more housing components defining the housing portions 712a, 712b, 712c, and 712d are one or more electrically conductive housing components. The housing components 714 and 715 may be similar in composition, physical properties, electrical properties, and other properties to the housing component 114b and, for brevity, that description is not repeated here. In addition, the one or more housing components defining the housing portions 712a, 712b, 712c, and 712d may be similar in composition, physical properties, electrical properties, and other properties to the housing components 112b and 112f and, for brevity, that description is not repeated here.

The housing component 714 extends along a rear surface 704 of the electronic device 700. In the example of FIGS. 7A and 7B, the housing component 714 also extends along one or more side surfaces 706 of the electronic device. Similarly, the housing component 715 may extend along the rear surface 704 and a side surface 706 of the electronic device 700.

In the example of FIGS. 7A and 7B, the housing 710 comprises one or more housing components formed from a material other than the thermoset composite material. In some cases, the different housing portions 712a, 712b, and 712c are formed by a single housing component. In other cases, the different housing portions 712a, 712b, and 712c are formed by different housing components, as is explained further below.

As an example, the housing portions 712a, 712b, and 712c may be formed by a single housing component. A gap between the housing portions 712a and 712b may appear as shown in FIG. 8 in locations where a slot is formed through the housing component. However, the slot which defines the gap may not extend through the housing component in other locations, allowing electrical contact between the housing portions 712a and 712b in these locations. Each of the housing components 714 and 715 may assist in mechanically or structurally coupling other portions of the housing 710. For example, the housing component 714 may assist in mechanically and structurally coupling the different housing portions 712a, 712b, and 712c.

In additional examples, the housing portion 712a may be formed by a first housing component and the housing portion 712b may be formed by a second housing component. A gap (e.g., 811 of FIG. 8) may be formed between the housing portions 712a and 712b and the housing component 714 may be introduced into the gap. When the housing portions 712a and 712b are formed of an electrically conductive material, the housing component 714 may electrically isolate the housing portion 712a from the housing portions 712b and 712c (e.g., to prevent electrical conduction or communication through the housing component 714). Each of the housing components 714 and 715 may mechanically or structurally couple the different components of the housing 710 which are formed from a material other than the thermoset composite material. For example, the housing component 714 may mechanically and structurally couple different housing components which define housing portions 712a, 712b, and 712c.

At least one of the housing portions 712a, 712b, and 712c may be configured to operate as an antenna. For example, the electronic device may comprise wireless transmission circuitry that is operably coupled to at least one of the housing portions 712b and 712c. In examples where each of the housing portions 712a, 712b, and 712c is defined by a different housing component, at least one of these housing components may be configured to operate as an antenna.

Alternately or additionally, the housing component 714 and/or 715 comprising the thermoset composite material may provide a window for an emitter and/or a receiver internal to the electronic device. For example, the housing component 714 and/or 715 may provide a window for an RF emitter, an RF receiver, and/or an RF transceiver. The RF emitter, RF receiver and/or RF transceiver may be part of a wireless communication system.

The example of FIGS. 7A and 7B is not limiting and in additional embodiments, the housing may comprise at least one housing component that includes a thermoset composite material and at least one housing component that is formed from a material other than the thermoset composite material. In some cases, a housing component including a thermoset composite material may extend exclusively along one surface of the electronic device, such as a rear surface of the electronic device.

The front cover 722 may be positioned over a display 742, and may provide a window through which the display may be viewed. In some embodiments, the display 742 may be attached to (or abut) the front cover 722. The front cover 722 may define a front surface 702 of the electronic device 700. The front cover 722 may be similar to the front cover 122 and, for brevity, that description is not repeated here. The electronic device may also include a thicker region 744 along the rear surface 704 of the electronic device, which may be similar to the region 144. The region 744 may accommodate one or more optical modules 752 of a camera assembly. The region 744 may also accommodate a sensor 754, such as a LiDAR sensor, and other components 753 such as a microphone, a smaller optical component such as a flash, and so forth. In the example of FIGS. 7A and 7B input devices 737 and 738 are provided along the side surface 706 of the device 700.

FIG. 8 shows an example of a cross-sectional view of the electronic device 700 of FIGS. 7A and 7B. In particular, FIG. 8 shows an example of a housing 810, which may be an example of the housing 710. The housing 810 includes a housing component 814 including a thermoset composite material. The housing component 814 may be formed from the thermoset composite material.

At least a portion of the housing component 814 is positioned in a gap 811 defined between the housing portions 812a and 812b, each of which is formed from a material other than the thermoset composite material. The housing component 814 may be a dielectric housing component and the housing portions 812a and 812b may be an electrically conducting housing portions. The cross-section through the housing 810 may be an example of a lateral cross-section through the housing 710 along C-C in FIG. 7B. The housing component 814 may be similar in composition, physical properties, electrical properties, and other properties to the housing component 114b and the housing portions 812a and 812b may be similar in composition, physical properties, electrical properties, and other properties to the housing components 112b and 112f and, for brevity, that description is not repeated here.

In the example of FIG. 8, the housing component 814 including the thermoset composite material substantially fills a gap 811 between the housing portions 812a and 812b, each of which is formed from a material other than the thermoset composite material. In embodiments, the housing component 814 is a structural component of the housing 810. In the example of FIG. 8, the housing component 814 provides structural integrity to the housing not only by substantially filling the gap 811 but also by providing support to the housing portion 812a in the vicinity of gap. As shown in FIG. 8, the thickness $t_2$ of the housing portion 814 is greater than a thickness $t_1$ of the housing portion 812a, enabling it to provide support to the housing portion 812a.

In a similar fashion as previously described for FIG. 2A, the housing portions 812a and 812b may define first and second portions and the housing component 814 may define a third portion of the exterior surface 806 of the housing. The exterior surface 806 may be a rear surface of the electronic device, as shown in FIG. 7. In some cases, the first, second, and third portions of the exterior surface 806 are substantially flush with one another, which can be achieved at least in part by co-machining the housing portions 812a, 812b, and the housing component 814. Similarly, the housing portions 812a and 812b may define first and second portions and the housing component 814 may define a third portion of the interior surface 807 of the housing. In addition, the housing component 814 extends along a portion of the interior surface of each of the housing portion 812a and the housing portion 812b.

As shown in FIG. 8, each of the housing portions 812a and 812b also defines a surface (808a, 808b) extending inward from the exterior surface 806 towards the interior surface 807. The housing component 814 is bonded to the surfaces 808a and 808b, which may also be referred to herein as bonding surfaces. The housing component 814 may also be bonded to the portions of the interior surface 807 of the housing (e.g., a portion of the interior surface of each of the housing portion 812a and the housing portion 812b). One or more of the surface(s) 808a and 808b and portions of the interior surface 807 (e.g., portions along which the housing component 814 extends) may be modified by one or more of mechanical texturing, chemical etching, anodization, use of a primer, and the like as previously described with respect to FIGS. 2A-2C. In the example of FIG. 8, each of the housing portions 812a and 812b also define one or more retention features such as a recess and/or an angled portion. For example, the housing component 814 extends into the recess formed into the housing portion 812b. These retention features may be similar to those previously described with respect to FIGS. 1A to 1B, 3, and 5-6 and, for brevity, that description is not repeated here.

FIG. 9 shows another example cross-sectional view of the device of FIGS. 7A-7B. In particular, FIG. 9 shows an example of a housing 910, which may be an example of the housing 710. The housing 910 includes a housing component 914 including a thermoset composite material. At least a portion of the housing component 914 is positioned in a gap 911 defined between the housing portions 912a and 912b, each of which is formed from a material other than the thermoset composite material. The housing component 914 may be a dielectric housing component and the housing portions 912a and 912b may be an electrically conducting housing portions. The cross-section through the housing 910 may be an example of a lateral cross-section through the housing 710 along C-C in FIG. 7B.

In the example of FIG. 9, the housing component 914 includes a first portion 914a which is formed from the thermoset composite material and a second portion 914b which is formed from a material other than the thermoset composite material of the portion 914a. In some cases, the second portion 914b may have a greater strength than the first portion 914a and the first portion 914a may be used as an inlay to provide a desired color and/or surface finish to the housing component 914. In some cases, a thickness of the first portion 914a is less than that of the second portion 914b. For example, the second portion 914b may have a thickness which is at least twice that of the first portion 914a.

In some cases, the second portion 914b is formed from a composite material including discontinuous reinforcing fibers in a matrix of a polymer material. In some cases, the matrix is formed from a thermoset polymer, such as an epoxy-based or polyurethane-based polymer. This composite material may therefore be an additional thermoset composite material. The reinforcing fibers may be glass fibers (e.g., fiberglass), carbon fibers, metal nanowires, aramid fiber, and/or other fiber or wires. In some examples, the fibers may have a diameter from about 3 microns to about 25 microns. In some cases, the loading of the fibers in the matrix is from about 20 vol % to about 40 vol %. In some examples, the composite materials of each of the first portion 914a and the second portion 914b have a matrix which is epoxy-based. The first portion 914a may be similar in composition, physical properties, electrical properties, and other properties to the housing component 114b and the housing portions 912a and 912b may be similar in composition, physical properties, electrical properties, and other properties to the housing components 112b and 112f and, for brevity, that description is not repeated here.

As previously described with respect to FIG. 8, the housing component 914 substantially fills the gap 911 and extends along portions of the interior surface of each of the housing portions 912a and 912b. In the example of FIG. 9, the housing component 914 provides structural integrity to the housing not only by substantially filling the gap 911 but also by providing support to the housing portion 912a in the vicinity of gap.

In a similar fashion as previously described for FIG. 8, the housing portions 912a and 912b may define first and second portions and the housing component 914 may define a third portion of the exterior surface 906 of the housing. Similarly, the housing portions 912a and 912b may define first and second portions and the housing component 914b may define a third portion of the interior surface 907 of the housing. In addition, each of the housing portions 912a and 912b also defines a surface (908a, 908b) extending inward from the exterior surface 906. The housing component 914 is bonded to these surfaces. The housing component 914 may also be bonded to the portions of the interior surface 907 of the housing. One or more of these surface(s) may be modified by one or more of mechanical texturing, chemical etching, anodization, use of a primer, and the like as previously described with respect to FIGS. 2A-2C. In addition, each of the housing portions 912a and 912b defines one or more retention features such as a depression and/or an angled portion. These retention features may be similar to those previously described with respect to FIGS. 1A to 1B, 3, and 5-6 and, for brevity, that description is not repeated here.

Figure 10:
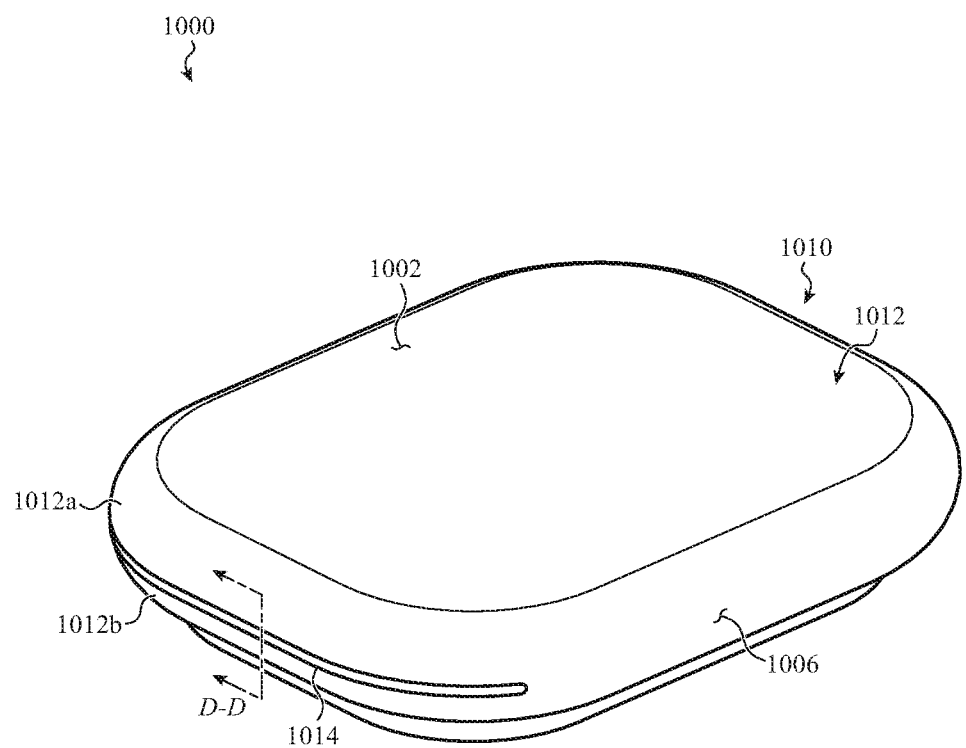
FIG. 10 shows another example electronic device.

FIG. 10 shows a further example electronic device. In the example of FIG. 10, the device 1000 includes an enclosure 1010 which includes a housing 1012 and a component 1014. The component 1014 may provide a window for an internal device component (such as the device component 1170 shown in FIG. 11). The housing 1012 defines an exterior surface 1002 and an exterior surface 1006. In some cases, the device 1000 may form a rear cup for a pair of headphones. The electronic device 1000 may further include an ear cushion which attaches to an end of the housing 1012 (e.g., generally opposite the exterior surface 1002). The exterior surface 1006 may extend between the exterior surface 1002 and the additional ear cushion. An ear band may also attach to the housing 1012 (e.g., along the surface 1006). The housing 1012 may at least partially enclose internal components of the electronic device.

The enclosure 1010 includes a component 1014 which includes a thermoset composite material and a housing 1012 which is formed from a material other than the thermoset composite material. In some cases, the component 1014 may be formed from the thermoset composite material. The component 1014 may be a dielectric component and the housing 1012 may be an electrically conducting housing. The component 1014 may be similar in composition, physical properties, electrical properties, and other properties to the housing component 114b and, for brevity, that description is not repeated here. In addition, the housing 1012 may be similar in composition, physical properties, electrical properties, and other properties to the housing components 112b and 112f and, for brevity, that description is not repeated here.

Figure 11:
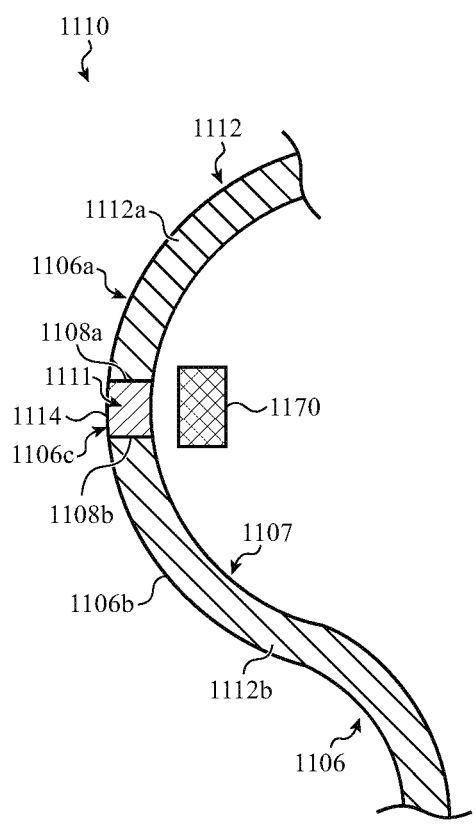
FIG. 11 shows an example cross-sectional view of the device of FIG. 10.

The housing 1012 defines an opening (e.g., 1111 as shown in the cross-section view of FIG. 11). The component 1014 including the thermoset composite material is positioned within the opening and bonded to the housing 1012. The housing 1012 may at least partially surround an emitter and/or receiver. When the housing 1012 is formed from an electrically conducting material, the component 1014 may provide a "window" for the emitter, receiver, and/or transceiver in some embodiments.

In the example of FIG. 10, the opening 111 is defined between a first portion 1012a and a second portion 1012b of the housing 1012. The first portion 1012a defines a first portion and the second portion 1012b defines a second portion of the exterior surface 1006 of the housing 1012. The example of FIG. 10 is not limiting and in other examples the housing 1012 may have a different shape. For example, the exterior surface 1002 may define a shape that is less square and closer to an oval and the exterior surface 1006 may have a greater height relative to the length and width of the surface 1002. Further, an opening may alternately or additionally be included in a different surface of the housing than shown in the example of FIG. 10.

The housing 1012 may also be described as having a wall which defines at least a portion of the opening (e.g., the wall defining the surfaces 1108a and 1108b, which in turn define the opening 1111 as shown in the cross-section view of FIG. 11). The surface(s) of the wall may be modified by one or more of mechanical texturing, chemical etching, anodization, use of a primer, and the like as previously described with respect to FIGS. 2A-2C. In addition, the housing 1012 may include a retention feature as previously described with respect to FIG. 3. For brevity, the description previously provided with respect to FIGS. 2A-2C and 3 is not repeated here.

FIG. 11 shows an example of a cross-sectional view of the electronic device 1000 of FIG. 10. In particular, FIG. 11 shows an example of an enclosure 1110. The enclosure 1110 includes a component 1114 including a thermoset composite material positioned in an opening 1111 of a housing 1112 which is formed from a material other than the thermoset composite material. In some cases, the component 1114 may be formed from the thermoset composite material. In some cases, the component 114 is a dielectric component and the housing 112 is an electrically conducting housing. The cross-section through the enclosure 1110 may be an example of a vertical cross-section through the enclosure 1010 along D-D in FIG. 10. FIG. 11 also shows a device component 1170 positioned behind the component 1114. The component 1114 may be similar in composition, physical properties, electrical properties, and other properties to the housing component 114b and the housing 1112 may be similar in composition, physical properties, electrical properties, and other properties to the housing components 112b and 112f and, for brevity, that description is not repeated here.

In the example of FIG. 11, the component 1114 including the thermoset composite material substantially fills an opening 1111 in a housing 1112, which is formed from a material other than the thermoset composite material. In embodiments, the component 1114 is a structural component of the enclosure 1110. The housing 1112 includes the portions 1112a and 1112b, which at least partially define the opening 1111. The portion 1112a of the housing 1112 defines a portion 1106a, the portion 1112b defines a portion 1106b, and the component 1114 defines a portion 1106c of the exterior surface 1106 of the housing. In the example of FIG. 11, the portion 1106a, the portion 1106b, and the portion 1106c of the exterior surface 1106 together define a curved region of the exterior surface 1106. In addition, the portions 1112a and 1112b of the housing 1112 and the component 1114 together define a curved region of the interior surface 1107. The exterior curved region may define a convex curve and the interior curved region may define a convex curve in the plane of a vertical cross-section through the housing 1112.

As shown in FIG. 11, the portion 1112a of the housing 1112 also defines a surface 1108a extending inward from the portion 1106a of the exterior surface 1106 (towards the interior surface 1107). In addition, the portion 1112b of the housing 1112 defines a surface 1108b extending inward from the portion 1106b of the exterior surface 1106. The opening is defined at least in part between the surfaces 1108a and 1108b, which generally face each other. The component 1114 is positioned between and bonded to the surfaces 1108a and 1108b, which may also be referred to herein as bonding surfaces. The surface(s) 1108a and 1108b may be modified by one or more of mechanical texturing, chemical etching, anodization, use of a primer, and the like as previously described with respect to FIGS. 2A-2C.

In some cases, the component 1114 provides a transmissive window for a device component 1170. The device component 1170 may be an emitter component, a receiver component, or a transceiver component. In some embodiments, the device component 1170 is part of a wireless communication system. As examples, the wireless communication system may be a radio-frequency or an infrared communication system and the device component 1170 may include one or more antennas. In additional cases, the device component 1170 may be a sensor. For example, the sensor may be a magnetic sensor, a radio-frequency identification chip, a Hall-effect sensor, or the like. In an additional example, the device component 1170 may include a mm wave antenna that is configured to conduct 5G communications. In addition, the component 1114 may define a portion of a waveguide or allow for beam-forming or beam-directing functionality.

Figure 12:
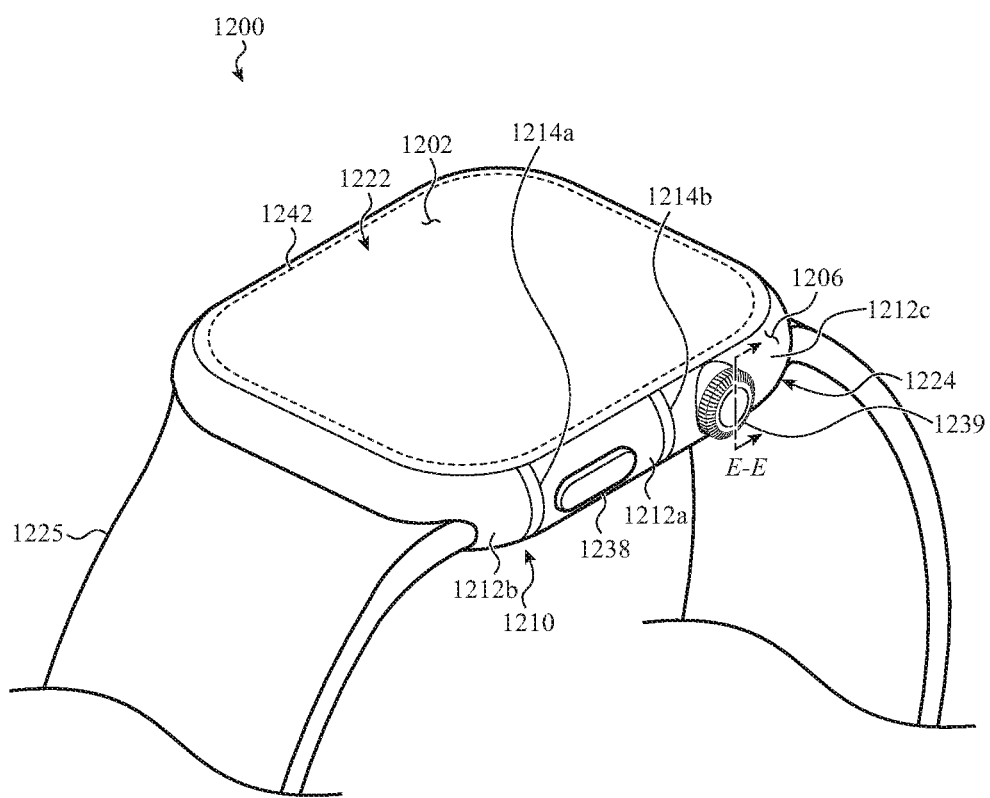
FIG. 12 shows an example of a wearable electronic device.

FIG. 12 shows an example of a wearable electronic device. For example, the device 1200 may be a watch. The device 1200 includes a housing 1210, a front cover 1222, and a rear cover 1224. The front cover 1222 may define a front surface 1202 of the device and the housing 1210 may define a side surface 1206 of the device. A band 1225 may be attached to the housing 1210 and configured to secure the wearable electronic device to a user.

In the example of FIG. 12, the housing 1210 includes multiple housing components (e.g., 1214a, 1214b) including a thermoset composite material. The housing components 1214a and 1214b may be formed from a thermoset composite material. The housing 1210 also includes multiple housing components (e.g., 1212a, 1212b, 1212c) formed of a material other than the thermoset composite material. The housing components 1214a and 1214b may be dielectric housing components and the components 1212a, 1212b, and 1212c may be electrically conducting housing components. The housing components 1214a may mechanically or structurally couple the housing components 1212a and 1212b and the housing component 1214b may mechanically or structurally couple the housing components 1212a and 1212c. As previously discussed with respect to FIGS. 1A and 1B, the housing components 1214a and 1214b may electrically isolate adjacent electrically conductive components. For example, some degree of electrical isolation of the housing components 1212a and 1212b may be desirable when at least one of the housing components 1212a and 1212b is configured to radiate electromagnetic radiation. The housing components 1214a and 1214b may be similar in composition, physical properties, electrical properties, and other properties to the housing component 114b and, for brevity, that description is not repeated here. In addition, the housing components 1212a, 1212b, and 1212c may be similar in composition, physical properties, electrical properties, and other properties to the housing components 112b and 112f and, for brevity, that description is not repeated here.

The device 1200 further includes input members 1238 and 1239. The input member 1239 may be part of a crown module of the electronic device 1200. As discussed further with respect to FIG. 13, in some cases the input member 1239 includes a component (e.g., 1314) including a thermoset composite material. The input member 1239 has an outer surface configured to receive a rotary user input and also is configured to receive input in the form of a "press." In addition, the input member 1239 may provide an electrode for a biosensor within the electronic device 1200. For example, the input member 1239 may include an electrode which can be used for taking an electrocardiogram. The housing 1210 can form one or more other electrodes for taking the electrocardiogram or a conductive terminal may be formed on the housing to serve as the other electrode. A crown module may be positioned at least partially within an aperture formed within the housing 1210.

The front cover 1222 may be positioned over a display 1242, and may provide a window through which the display may be viewed. In some cases, the display 1242 is a touch-sensitive display. In some embodiments, the display 1242 may be attached to (or abut) the front cover 1222. In some cases, the front cover 1222 may include a flat middle portion larger than the viewable area of the display and a curved edge portion surrounding the flat middle portion. The curved edge portion may coincide with a curved exterior surface of the housing to form a continuous contoured surface. The front cover 1222 may be formed from similar materials as the front cover 122 and, for brevity, that description is not repeated here.

Figure 13:
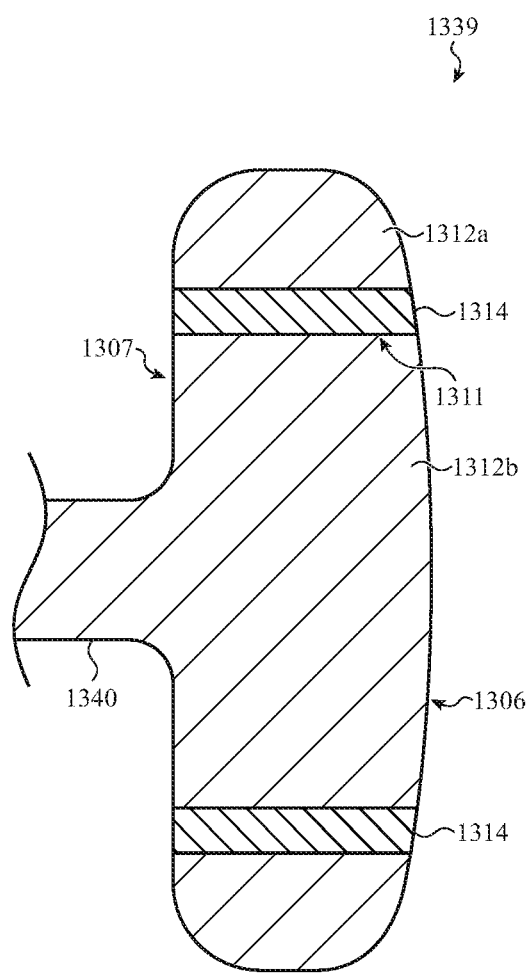
FIG. 13 shows an example cross-sectional view of the device of FIG. 12.

FIG. 13 is an example cross-sectional view of the device of FIG. 12. In particular, FIG. 13 shows an example of an input member 1339. The input member 1339 includes a component 1314 including a thermoset composite material. In some cases, the component 1314 may be formed from the thermoset composite material. Each of the components 1312*a* and 1312*b* are formed from a material other than the thermoset composite material. The component 1314 may be a dielectric component and the components 1312*a* and 1312*b* may be electrically conducting components. The input member further defines a shaft 1340, which may extend into the housing (e.g., 1210 in FIG. 12).

At least a portion of the component 1314 is positioned in a gap 1311 defined between the components 1312*a* and 1312*b*. The component 1314 may mechanically and structurally couple the components 1312*a* and 1312*b*. In embodiments, the component 1314 is a structural component of the input member 1339. The component 1314 may define a ring, as shown in FIG. 12.

In embodiments when the components 1312*a* and 1312*b* are formed from an electrically conducting material such as a metal, the component may also electrically isolate adjacent electrically conductive housing components. For example, the component 1312*b* may serve as an electrode for a biosensor within the electronic device. Electrical isolation of the component 1312*b* from the component 1312*a* may facilitate operation of the biosensor by reducing opportunities for unintended contact between the electrode and user. In some cases, the electrode can be used for taking an electrocardiogram. The housing can form one or more other electrodes for taking the electrocardiogram or a conductive terminal may be formed on the housing to serve as the other electrode. The cross-section through the input member 1339 may be an example of a vertical cross-section through the input member 1239 along E-E in FIG. 12.

In some examples, the component 1314 may be similar in composition, physical properties, electrical properties, and other properties to the housing component 114*b*. However, in other examples the component 1314 may be able to have a lower glass transition temperature and strength than the housing component 114*b* in order to decrease the cure temperature and/or decrease the cure time. The components 1312*a* and 1312*b* may be similar in composition, physical properties, electrical properties, and other properties to the housing components 112*b* and 112*f*. For brevity, the description of physical properties, electrical properties, and other properties of the housing components 114*b*, 112*b*, and 112*f* is not repeated here.

The components 1312*a* and 1312*b* may define first and second portions and the component 1314 may define a third portion of the exterior surface 1306 of the input member 1339. In some cases, the first, second, and third portions of the exterior surface 1306 are substantially flush with one another, which can be achieved at least in part by co-machining the housing components 1312*a*, 1312*b*, and 1314.

As shown in FIG. 13, each of the housing components 1312*a* and 1312*b* also defines a surface extending inward from the exterior surface 1306 towards the interior surface 1307. The housing component 1314 is bonded to these surfaces, which may also be referred to herein as bonding surfaces. One or more of the surfaces may be modified by one or more of mechanical texturing, chemical etching, anodization, use of a primer, and the like as previously described with respect to FIGS. 2A-2C.

Figure 14B:
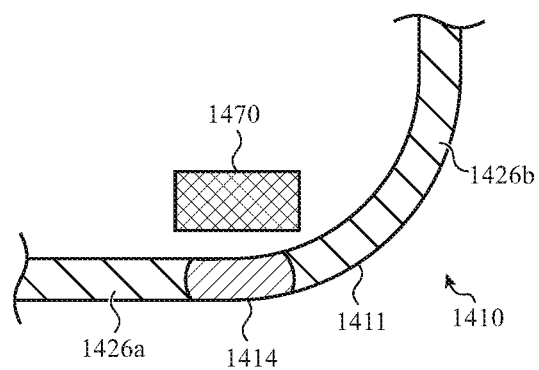

FIGS. 14A and 14B show an example of an electronic device 1400, with FIG. 14B showing an example cross-sectional view of FIG. 14A along F-F. The device 1400 includes an enclosure 1410. The enclosure 1410 comprises a component 1414 including a thermoset composite material, which is placed near a corner 1411 of the enclosure. The component 1414 may be a dielectric component. The component 1414 may provide a window for a device component internal to the enclosure (as shown in FIG. 14B). Corners of the enclosure 1410 may have a greater tendency to experience impact during a drop event, but the component 1414 is configured to have sufficient impact resistance to be located near a corner. As previously discussed, the component 1414 may be configured to have sufficient ductility and strength to provide the enclosure 1410 with structural integrity. In some examples, the component 1414 may be similar in composition, physical properties, electrical properties, and other properties to the housing component 114*b*.

The enclosure 1410 also includes a housing 1412 formed from a material other than a thermoset composite material. For example, the housing 1412 may be formed from a metal, a glass, a glass-ceramic, a ceramic, or a combination of these materials. In some cases, the housing 1412 is an electrically conducting housing. In some examples, the housing 1412 may be similar in composition, physical properties, electrical properties, and other properties to the housing components 112*b* and 112*f*.

When the housing 1412 is formed from an electrically conductive material, the component 1414 may be positioned over an emitter component (also referred to herein as an emitting component, a radiating component or simply as an emitter), a receiver component (also referred to herein as a receiving component or simply as a receiver), a transceiver component, or a sensor component (also referred to herein as a sensing component) positioned within the housing 1410). FIG. 14B shows a device component 1470 positioned within the housing.

The housing 1412 includes a front wall 1422, a rear wall 1424, and four side walls. Sidewalls 1426*a* and 1426*b* are shown in FIG. 14A. In the example of FIG. 14A, the housing 1412 defines four corners. A corner 1411 of the housing 1412 may correspond to a region or portion of the housing in which one side (e.g., 1426*a*) transitions to another side (e.g., 1426*b*). The corners are shown to be rounded in FIG. 14A but may alternatively be square or have another profile shape (e.g., a squared or angled corner).

In the example of FIG. 14A, the component 1414 is positioned on the sidewall 1426*a* proximate the corner 1411. The component 1414 may define a first portion of the sidewall 1426*a* while the housing 1412 may define a second portion of the sidewall 1426*b*.

FIG. 14B shows an example cross-sectional view of the device 1400 of FIG. 14A. The cross-section extends through the component 1414 and through portions of the sidewalls 1426*a* and 1426*b*. As shown in FIG. 14B, the electronic device 1400 also includes a device component 1470 positioned behind the housing component 1414. In some cases, the housing component 1414 provides a transmissive window for the device component 1470.

The device component 1470 may be an emitter component, a receiver component, a transceiver component, or a sensor component. In some embodiments, the device component 1470 is part of a wireless communication system. As examples, the wireless communication system may be a radio-frequency or an infrared communication system. In some cases, the device component 1470 may be an antenna. In additional embodiments, the device component 1470 may be a sensor. In further embodiments, the device component 1470 may be part of a wireless charging system, which may be an inductive coupling wireless charging system or an RF wireless charging system. For example, the device component may include a wireless receiver component such as a wireless receiver coil or other feature of the wireless charging system. The device component 1470 may be similar to the device component 1170 and, for brevity, that description is not repeated here.

FIGS. 15A, 15B, and 15C show another example electronic device 1500. In FIG. 15A the front cover 1522 and the sidewalls 1526a and 1526b of the device are visible. In FIG. 15B the rear cover 1524 and the sidewalls 1526a and 1526c are visible. FIG. 15C shows an example cross-sectional view through the front cover 1522.

The device 1500 includes a housing 1510. The housing 1510 comprises housing components 1514, 1516, and 1518 including a thermoset composite material. The housing 1510 also includes first and second housing components 1512a and 1512b formed from a material other than a thermoset composite material. For example, the housing components 1512a and 1512b may be formed from a metal, a glass, a glass-ceramic, a ceramic, or a combination of these materials. In some embodiments, the housing components 1514, 1516, and 1518 are dielectric housing components while the housing components 1512a and 1512b are electrically conductive housing components. The housing components 1514, 1516, and 1518 may be similar in composition, physical properties, electrical properties, and other properties to the housing component 114b. The housing components 1512a and 1512b may be similar in composition, physical properties, electrical properties, and other properties to the housing components 112b and 112f.

In the example of FIGS. 15A and 15B, the housing component 1516 is located centrally on a front wall 1522 of the housing, the housing component 1518 is positioned at least partially between the housing components 1512a and 1512b, and the housing component 1514 is located centrally on a rear wall 1524 of the housing. The examples of FIGS. 15A to 15C are not limiting and in other examples the housing components 1514 and 1516 need not be located centrally on the front or the back wall and in some cases may be located onto a side wall of the housing 1510.

As shown in FIGS. 15A and 15B, the housing component 1518 is positioned at least partially between and bonded to the housing components 1512a and 1512b. For example, the housing component may be positioned in a gap between the housing components 1512a and 1512b in a similar fashion as shown with respect to the examples of FIGS. 2A and 3. As shown in FIGS. 15A and 15B, the housing component extends around a perimeter of the housing 1510. The housing component 1518 may be configured to have sufficient strength and impact resistance so that the housing 1510 maintains structural integrity. In some cases, use of the housing component 1518 to bond the housing components 1512a and 1512b may simplify assembly of the housing 1510.

In some cases, the housing component 1514 may provide a transmissive window over an internal device component. For example, the housing component 1514 may form a transmissive window over an internal device component when the housing component 1512b is formed from an electrically conductive material. The internal device component may be similar to the device component 1070 or 1470 and, for brevity, that description is not repeated here. The housing component 1514 may be configured to have sufficient strength and impact resistance so that the rear wall 1524 maintains structural integrity.

In some cases, the housing component 1516 may provide a decorative effect to the housing 1510, as shown in FIG. 15C. FIG. 15C shows an example cross-sectional view of the device 1500 of FIG. 15A along G-G. The cross-section extends through the housing component 1516 and the first housing component 1512a. In the example of FIG. 15C, the housing component 1516 does not extend through a thickness of the housing component 1512a. For example, the housing component 1516 may form a logo or may cover a recess in the housing component 1512a. In some examples, the housing component 1516 may be similar in composition, physical properties, electrical properties, and other properties to the housing component 114b. However, in other examples the housing component 1516 may be able to have a lower glass transition temperature and strength than the housing component 114b in order to decrease the cure temperature and/or decrease the cure time. The housing component 1516 may be configured to have sufficient strength and impact resistance so that the front wall 1522 maintains structural integrity.

The housing 1510 includes a front wall 1522, a rear wall 1524, and four side walls. Sidewalls 1526a, 1526b, and 1526c are shown in FIGS. 15A and 15B. In the example of FIGS. 15A to 15C, the housing 1510 defines four corners. The corners are shown to be rounded in FIGS. 15A and 15B but may alternatively be square or have another profile shape (e.g., a squared or angled corner). In additional embodiments, the housing 1510 need not have corners and/or sidewalls. For example, the housing 1510 may have a cylindrical or a lenticular form.

FIG. 16 shows a flow chart of an example process 1600 for forming a housing or enclosure including a thermoset composite material. In the example of FIG. 16, a housing or a component of the housing is formed from a material other than a thermoset composite material. For example, the housing or housing component(s) may be formed from a metal, a glass, a glass-ceramic, a ceramic, or a combination of these materials. The thermoset composite material may form a housing component when the housing includes multiple components formed from the other material(s). The thermoset composite material may form a component of an enclosure when the housing is formed from a single piece of the other material.

The process 1600 includes an operation 1602 of pretreating a surface of the housing or housing component formed from the material other than the thermoset composite material. For example, the surface can be modified by one or more of mechanical texturing, chemical etching, anodization, use of a primer, and the like. FIG. 2D shows an example of an aluminum alloy housing component which has been modified by mechanical texturing, anodization, and use of a primer.

In some cases, the surface is pretreated by forming a texture on the surface. Depending on the shape of the housing or housing component, mechanical texturing may include a grinding operation or another form of abrasive treatment such as wet or dry grit blasting. The texture may also be formed at least in part through chemical etching. Chemical etching techniques may involve using a suitable acid or base (e.g., a hydrofluoric acid-based etchant) to remove portions of the glass cover member. The chemical etching may occur in the liquid phase or in a gas phase. Etching techniques also include reactive ion etching, which may use a mixture of a fluorine containing compound such as $CH_4$, $CHF_3$, $SF_6$ and the like in a gas such as argon or xenon.

A texture may also be formed on the surface due to forming an anodization layer on the surface. When the housing or housing component is formed from a metal material, electrochemical oxidation of the metal material can produce an anodization layer formed from a metal oxide. In some cases, the anodization layer is formed during a phosphoric acid anodizing (PAA) process. The anodization layer is typically thicker than a native oxide layer formed on the metal. For example, the anodization layer may have an average thickness from about 250 nm to about 2 microns or from about 500 nm to about 1.25 microns. In some cases, the anodization layer may be porous. For example, the pores may have an average diameter from about 10 nm to about 100 nm or from about 25 nm to about 75 nm. These pores may contribute to the surface texture.

Alternately or additionally, the surface may be pretreated using a primer. In some cases, the primer may include a coupling agent. The coupling agent may be configured to interact with both the thermoset composite material and the surface of the housing or housing component. For example, the coupling agent may interact with a metal oxide formed on the surface such a native oxide layer, an anodization layer, or a sol-gel coating. The coupling agent may also interact with glass, glass-ceramic, and oxide ceramic housing components. In some cases, the coupling agent may be silane-based. For example, the coupling agent may be derived from an alkoxy silane such as a dialkoxy or trialkoxy silane. The alkoxy silane may also include a functional group capable of interacting with one or more components of the polymerizable mixture. For example, the alkoxy silane may include an epoxy group when the thermoset composite material is epoxy-based. When the interface region includes a porous anodization layer, the coupling agent may enter the pores of the anodization layer.

In additional examples, the interface region may include a primer other than a silane-based coupling agent. For example, the primer may be derived from a polymerizable mixture different from that used to form the thermoset composite material. In some cases, an epoxy-based primer may be used for both epoxy-based and polyurethane-based thermoset composite materials. When the interface region includes a porous anodization layer, the primer may enter the pores of the anodization layer.

The process 1600 also includes an operation 1604 of dispensing a polymerizable mixture onto the surface of the housing or housing component. In some cases, the housing defines an opening and the polymerizable mixture is introduced into the opening. In additional cases, a gap is formed between two housing components and the polymerizable mixture is introduced into the gap. The polymerizable mixture is typically in liquid form and operation 1604 may be a liquid molding technique or a liquid/wet compression molding technique.

Figure 17A:
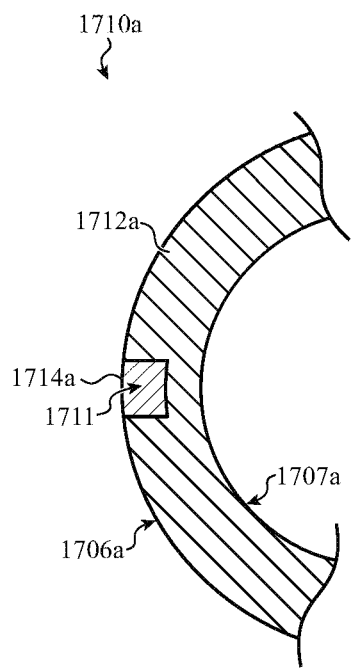
FIGS. 17A and 17B show examples of a housing assembly at different stages in the process of FIG. 16.

Surfaces of the housing defining the opening or surfaces of the housing components defining the gap form at least part of a mold for the polymerizable mixture (e.g., the sides of the mold). In some cases, the opening or gap extends through the thickness of the housing or housing component. One or more mold components may be used to provide additional parts of the mold (e.g., a bottom of the mold) in such cases or when it is desired to close the mold (e.g., to apply pressure). In some embodiments one or more of the additional components of the mold may be textured. In additional cases, the opening does not extend completely through the thickness of the housing or housing component as shown in FIG. 17A. No additional mold components are required as the housing component forms both the sides and the bottom of the mold.

The polymerizable mixture typically includes a pre-polymer of the thermoset polymer. For example, a polymerizable mixture for forming an epoxy-based thermoset may include an epoxy pre-polymer molecule having two or more epoxide functional groups and a polymerizable mixture for forming a polyurethane-based thermoset may include polyurethane pre-polymer having two or more isocyanate functional groups. The polymerizable mixture typically includes a curing agent. Polymerizable mixtures suitable for forming the thermoset composite materials described herein further comprise a reinforcement material such as nano-sized silica or ceramic particles. The polymerizable mixture may further include pigments as well as other additives. A more detailed description of components of polymerizable mixtures is provided below.

An epoxy-based thermoset may be formed by reacting an epoxy pre-polymer molecule having two or more epoxide functional groups with a curing agent. An epoxy-based thermoset may also be referred to herein simply as a cross-linked epoxy polymer or matrix. Reference to an epoxy pre-polymer molecule herein may also refer to multiple epoxy-prepolymer molecules of the same type or of different types. Examples of epoxy pre-polymers include, but are not limited to, bisphenol-based pre-polymers (e.g., bisphenol A diglycidal ether, abbreviated as BADGE or DGEBA), aliphatic epoxy pre-polymers such as cycloaliphatic epoxy pre-polymers, novolac-based pre-polymers, and glycidyalamine pre-polymers (e.g., N,N,O-triglycidylamino-4-phenol (TGAP) or N,N,N',N'-tetraglycidyl diamino-4-4'-diphenylmethane (TGDDM)). In some cases, fluorinated epoxy pre-polymers may be used. Examples of curing agents include, but are not limited to, polyfunctional primary amines, anhydrides, phenols, and the like.

A polyurethane-based thermoset may be formed by reacting a polyurethane pre-polymer having two or more icocyanate functional groups with a curing agent. A polyurethane-based thermoset polymer may also be referred to herein simply as a cross-linked polyurethane polymer or matrix. Reference to a polyurethane pre-polymer molecule herein may also refer to multiple epoxy-pre-polymer molecules of the same type or of different types. The polyurethane pre-polymer may be formed by reacting a polyol with a diisocyante. Examples of diisocyanates include aromatic and aliphatic diisocyanates. Examples of polyols include, but are not limited to, polyether polyols, polyester polyols, polycaprolactone polyols and polycarbonate polyols. Examples of curing agents include, but are not limited to, hydroxyl functional curing agents and amine functional curing agents (e.g., aromatic diamines).

In some embodiments, the polymerizable mixture includes nano-sized silica particles. For example, the nano-sized silica particles may have a size (e.g., an average diameter) from 10 nm to 100 nm or from 15 nm to 50 nm. The thermoset composite component may include from 10 wt % to 50 wt % of the silica particles. In some cases, nano-sized ceramic particles, such as nano-sized oxide particles, may alternately or additionally be included in the polymerizable mixture. These particles may include, but are not limited to, zirconia, alumina, and/or titanium dioxide particles. However, some of these materials may have a greater dielectric constant than silica and may be less suitable when a substantially RF transparent component is desired. In additional embodiments, at least some of particles included in the mixture may have a larger size, such as greater than 100 nm and less than 20 microns (micrometers), greater than 100 nm and less than 10 microns, greater than 100 nm and less than 5 microns, and greater than 100 nm and less than 1 micron. In some cases, the particle size is an average particle size.

In some cases, the polymerizable mixture includes one or more pigments which help to impart a durable color to the thermoset composite component. In some cases, particles of the pigment may be micro-sized or nano-sized. As examples, the pigment particles may have a size less than 20 microns, less than 10 microns, less than 5 microns, less than 1 micron, from 10 nm to 100 nm, from 50 nm to 500 nm, from 500 micron to 5 microns, or from 5 microns to 20 microns. In some cases, the pigment may include an inorganic or carbon pigment, such as titanium dioxide, carbon black, iron oxide, sodium aluminum silicate, and combinations thereof. When the thermoset composite material is used to electrically isolate electrically conductive housing components from each other, the carbon black may have a low conductivity and/or may be included in amounts which do not render the thermoset composite material electrically conductive. In additional cases, the pigment is an organic pigment such as phthalocyanine, benzimidazolone, diarylide, diaszoprya-zolone, quinacridone, and the like. The pigment loading may be from about 1 wt % to about 5 wt %, from about 2 wt % to about 10 wt %, or from about 5 wt % to about 10 wt %. In some cases, the pigments may be dispersed in a carrier vehicle prior to being added to the polymerizable mixture.

The process 1600 also includes an operation 1606 of curing the polymerizable mixture to form the thermoset composite material. Operation 1606 produces an assembly of the thermoset composite material and the housing or housing component(s) formed from a material other than the thermoset composite material. For brevity, this assembly may also be referred to herein as a housing assembly. For example, the polymerizable mixture may be heated to cure the polymerizable mixture and form the crosslinked thermoset composite material. The polymerizable mixture may be heated to a temperature above the desired glass transition temperature. In some cases, the curing temperature may be from about 100° C. to about 150° C. Following operation 1606, the thermoset composite material is typically bonded to the housing or housing component(s) formed from a material other than the thermoset composite material. In some cases, the bonding between the thermoset composite material and the other material includes adhesive bonding between the thermoset composite material and the other material and/or a component of the interface region such as an anodization layer, a primer, and so forth. For example, the adhesive bonding may include chemical interactions, physical interactions, or both.

The process 1600 also includes an operation 1608 of co-machining the housing assembly. The operation 1608 typically involves machining both the thermoset composite material and adjoining portions of the housing or the housing component(s) formed from a material other than the thermoset composite material. Operation 1608 may include one or more machining operations, such as a rough machining operation and a fine machining operation. Operation 1608 may involve removing material from one or both of the interior and the exterior surfaces of the housing assembly. For example, the interior surface of the housing assembly shown in FIG. 17A may be machined to arrive at the housing assembly shown in FIG. 17B. In some cases, the housing assembly may be heated between the rough machining operation and the fine machining operation. For example, when the housing assembly is to undergo an anodization process and/or a physical vapor deposition process, the housing assembly may be heated to a temperature similar to the temperature that the housing assembly will experience during the anodization process and/or the physical vapor deposition process.

The process 1600 also includes an operation 1610 of texturing the housing assembly of the thermoset composite material and the housing components formed from the material other than the thermoset composite material. In some cases, the housing assembly may be given a smooth or polished texture. In additional cases, the housing assembly may be given a rougher texture, such as a sand-blasted texture. In some cases, the operation 1610 may be optional.

The process 1600 also includes an operation 1612 of anodizing the housing assembly. The operation 1612 may form an anodization layer on the exterior surface of the housing or housing components formed at least in part from a metal material. In some cases, the anodization layer formed during the operation 1612 may be thicker than an anodization layer formed during the operation 1602. For example, the anodization layer formed during the operation 1610 may be at least twice the thickness of the anodization layer formed during the operation 1602. The anodization layer formed on different metal components may be the same or may be different. If desired, the anodized layer formed during the operation 1612 may be dyed and sealed to impart a desired color to the housing or housing components. As an alternative to operation 1612, a desired color may be imparted to the housing or housing component using a physical vapor deposition process to deposit a coating on the housing assembly. In some cases, the operation 1612 may be optional, such as for glass, glass-ceramic, and ceramic housing components.

The process 1600 also includes an operation 1614 of polishing the thermoset composite material of the housing assembly. In particular, a surface of the thermoset composite material defining an exterior surface of the assembly may be polished to remove small amounts of discoloration that may occur in operation 1612. In some cases, the operation 1614 may be optional.

Figure 17B:
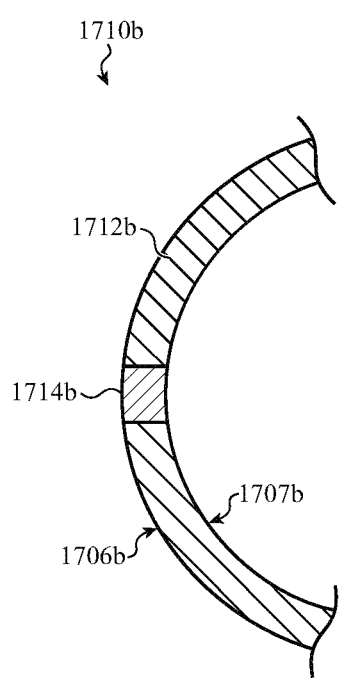

FIGS. 17A and 17B show examples of a housing assembly at different stages in the operation of FIG. 16. FIG. 17A shows an example of a cross-sectional view of a housing assembly 1710a after the operation 1606 of curing the polymerizable mixture to form the thermoset composite material. In FIG. 17A, the housing assembly 1710a includes a thermoset composite material 1714a cured in a recess 1711 formed in a housing component 1712a. The back of the recess forms the back side of the mold, so no additional molding component is needed to form the back side of the mold. This configuration can be useful when the interior and/or exterior surfaces of the housing component(s) such as 1712a define a curved surface. In the example of FIG. 17A, the interior surface 1707a defines a concave curve and the exterior surface 1706a defines a convex curve in the plane depicted. The housing component 1712a is formed of a material other than the thermoset composite material and in some cases may be formed of a metal material or any of the other materials described with respect to FIGS. 1A and 1B.

FIG. 17B shows an example of a cross-sectional view of a housing assembly 1710b after an operation 1608 of co-machining the housing assembly 1710a of FIG. 17A. The operation 1608 removes material from at least the interior surface 1707a of the housing component 1712a to form the housing component 1712*b*. Following the operation 1608 the thermoset composite material 1714*b* extends from the exterior surface 1706*b* to the interior surface 1707*b* of the housing assembly 1710*b*. The operation 1608 may further remove material from the exterior surface 1706*a* of the housing component 1712*a*.

FIG. 18 shows a block diagram of a sample electronic device that can incorporate a component comprising a thermoset composite material as described herein, such as a housing component comprising a thermoset composite material. The schematic representation depicted in FIG. 18 may correspond to components of the devices depicted in FIGS. 1A to 17B as described above. However, FIG. 18 may also more generally represent other types of electronic devices with components comprising a thermoset composite material as described herein.

In embodiments, an electronic device 1800 may include sensors 1820 to provide information regarding configuration and/or orientation of the electronic device in order to control the output of the display. For example, a portion of the display 1808 may be turned off, disabled, or put in a low energy state when all or part of the viewable area of the display 1808 is blocked or substantially obscured. As another example, the display 1808 may be adapted to rotate the display of graphical output based on changes in orientation of the device 1800 (e.g., 90 degrees or 180 degrees) in response to the device 1800 being rotated.

The electronic device 1800 also includes a processor 1806 operably connected with a computer-readable memory 1802. The processor 1806 may be operatively connected to the memory 1802 component via an electronic bus or bridge. The processor 1806 may be implemented as one or more computer processors or microcontrollers configured to perform operations in response to computer-readable instructions. The processor 1806 may include a central processing unit (CPU) of the device 1800. Additionally, and/or alternatively, the processor 1806 may include other electronic circuitry within the device 1800 including application specific integrated chips (ASIC) and other microcontroller devices. The processor 1806 may be configured to perform functionality described in the examples above.

The memory 1802 may include a variety of types of non-transitory computer-readable storage media, including, for example, read access memory (RAM), read-only memory (ROM), erasable programmable memory (e.g., EPROM and EEPROM), or flash memory. The memory 1802 is configured to store computer-readable instructions, sensor values, and other persistent software elements.

The electronic device 1800 may include control circuitry 1810. The control circuitry 1810 may be implemented in a single control unit and not necessarily as distinct electrical circuit elements. As used herein, "control unit" will be used synonymously with "control circuitry." The control circuitry 1810 may receive signals from the processor 1806 or from other elements of the electronic device 1800.

As shown in FIG. 18, the electronic device 1800 includes a battery 1814 that is configured to provide electrical power to the components of the electronic device 1800. The battery 1814 may include one or more power storage cells that are linked together to provide an internal supply of electrical power. The battery 1814 may be operatively coupled to power management circuitry that is configured to provide appropriate voltage and power levels for individual components or groups of components within the electronic device 1800. The battery 1814, via power management circuitry, may be configured to receive power from an external source, such as an alternating current power outlet. The battery 1814 may store received power so that the electronic device 1800 may operate without connection to an external power source for an extended period of time, which may range from several hours to several days.

In some embodiments, the electronic device 1800 includes one or more input devices 1818. The input device 1818 is a device that is configured to receive input from a user or the environment. The input device 1818 may include, for example, a push button, a touch-activated button, a capacitive touch sensor, a touch screen (e.g., a touch-sensitive display or a force-sensitive display), a capacitive touch button, dial, crown, or the like. In some embodiments, the input device 1818 may provide a dedicated or primary function, including, for example, a power button, volume buttons, home buttons, scroll wheels, and camera buttons.

The device 1800 may also include one or more sensors or sensor modules 1820, such as a force sensor, a capacitive sensor, an accelerometer, a barometer, a gyroscope, a proximity sensor, a light sensor, or the like. In some cases, the device 1800 includes a sensor array (also referred to as a sensing array) which includes multiple sensors 1820. For example, a sensor array associated with a protruding feature of a cover member may include an ambient light sensor, a Lidar sensor, and a microphone. As previously discussed with respect to FIG. 1B, one or more camera modules may also be associated with the protruding feature. The sensors 1820 may be operably coupled to processing circuitry. In some embodiments, the sensors 1820 may detect deformation and/or changes in configuration of the electronic device and be operably coupled to processing circuitry that controls the display based on the sensor signals. In some implementations, output from the sensors 1820 is used to reconfigure the display output to correspond to an orientation or folded/unfolded configuration or state of the device. Example sensors 1820 for this purpose include accelerometers, gyroscopes, magnetometers, and other similar types of position/orientation sensing devices. In addition, the sensors 1820 may include a microphone, acoustic sensor, light sensor (including ambient light, infrared (IR) light, ultraviolet (UV) light, optical facial recognition sensor, a depth measuring sensor (e.g., a time of flight sensor), a health monitoring sensor (e.g., an electrocardiogram (erg) sensor, a heart rate sensor, a photoplethysmogram (ppg) sensor, a pulse oximeter, a biometric sensor (e.g., a fingerprint sensor), or other types of sensing device.

In some embodiments, the electronic device 1800 includes one or more output devices 1804 configured to provide output to a user. The output device 1804 may include display 1808 that renders visual information generated by the processor 1806. The output device 1804 may also include one or more speakers to provide audio output. The output device 1804 may also include one or more haptic devices that are configured to produce a haptic or tactile output along an exterior surface of the device 1800.

The display 1808 may include a liquid-crystal display (LCD), a light-emitting diode (LED) display, an LED-backlit LCD display, an organic light-emitting diode (OLED) display, an active layer organic light-emitting diode (AMOLED) display, an organic electroluminescent (EL) display, an electrophoretic ink display, or the like. If the display 1808 is a liquid-crystal display or an electrophoretic ink display, the display 1808 may also include a backlight component that can be controlled to provide variable levels of display brightness. If the display 1808 is an organic light-emitting diode or an organic electroluminescent-type display, the brightness of the display 1808 may be controlled by modifying the electrical signals that are provided to display elements. In addition, information regarding configuration and/or orientation of the electronic device may be used to control the output of the display as described with respect to input devices 1818. In some cases, the display is integrated with a touch and/or force sensor in order to detect touches and/or forces applied along an exterior surface of the device 1800.

The electronic device 1800 may also include a communication port 1812 that is configured to transmit and/or receive signals or electrical communication from an external or separate device. The communication port 1812 may be configured to couple to an external device via a cable, adaptor, or other type of electrical connector. In some embodiments, the communication port 1812 may be used to couple the electronic device 1800 to a host computer.

The electronic device 1800 may also include at least one accessory 1816, such as a camera, a flash for the camera, or other such device. The camera may be part of a camera assembly that may be connected to other parts of the electronic device 1800 such as the control circuitry 1810.

As used herein, the terms "about," "approximately," "substantially," "similar," and the like are used to account for relatively small variations, such as a variation of +/−10%, +/−5%, +/−2%, or +/−1%. In addition, use of the term "about" in reference to the endpoint of a range may signify a variation of +/−10%, +/−5%, +/−2%, or +/−1% of the endpoint value. In addition, disclosure of a range in which at least one endpoint is described as being "about" a specified value includes disclosure of the range in which the endpoint is equal to the specified value.

As used herein, the phrase "at least one of" preceding a series of items, with the term "and" or "or" to separate any of the items, modifies the list as a whole, rather than each member of the list. The phrase "at least one of" does not require selection of at least one of each item listed; rather, the phrase allows a meaning that includes at a minimum one of any of the items, and/or at a minimum one of any combination of the items, and/or at a minimum one of each of the items. By way of example, the phrases "at least one of A, B, and C" or "at least one of A, B, or C" each refer to only A, only B, or only C; any combination of A, B, and C; and/or one or more of each of A, B, and C. Similarly, it may be appreciated that an order of elements presented for a conjunctive or disjunctive list provided herein should not be construed as limiting the disclosure to only that order provided.

The following discussion applies to the electronic devices described herein to the extent that these devices may be used to obtain personally identifiable information data. It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not intended to be exhaustive or to limit the embodiments to the precise forms disclosed. It will be apparent to one of ordinary skill in the art that many modifications and variations are possible in view of the above teachings.

What is claimed is:

1. An electronic device comprising:
   a radio-frequency (RF) component; and
   an enclosure defining an internal cavity and at least partially surrounding the RF component, the enclosure comprising:
      a housing formed from a metal material and defining:
         a first exterior surface of the enclosure;
         a first surface extending inward from a first portion of the first exterior surface,
         a second surface facing the first surface and extending inward from a second portion of the first exterior surface; and
         a retention feature extending into the internal cavity; and
      a window formed from an RF-transmissive material, positioned over the RF component, adhered to the first and the second surfaces, and engaged with the retention feature, the RF-transmissive material defining a second exterior surface of the enclosure and including a thermoset composite material comprising nano-sized silica particles dispersed within a thermoset matrix.

2. The electronic device of claim 1, wherein the thermoset composite material has:
   a hardness from 70 to 95 on a Shore D hardness scale; and
   an impact strength from 50 J/m to 90 J/m.

3. The electronic device of claim 1, wherein the thermoset composite material has a dielectric constant from 2 to 4 as measured at a frequency of 2.5 GHz.

4. The electronic device of claim 1, wherein:
   the first and the second portions of the first exterior surface and the second exterior surface together define a curved region of the enclosure.

5. The electronic device of claim 1, wherein the RF component is part of a wireless communication system.

6. The electronic device of claim 1, wherein the RF component is a wireless receiver component of a wireless charging system.

7. The electronic device of claim 1, wherein:
   the thermoset composite material is a first thermoset composite material;
   the thermoset matrix is a first thermoset matrix; and
   the window further comprises a second thermoset composite material comprising fibers dispersed within a second thermoset matrix and defining a portion of an interior surface of the enclosure.

8. An electronic device comprising:
   an enclosure comprising:
      a housing component formed from a metal material and defining:
         a first exterior surface of the enclosure;
         an opening extending from the first exterior surface of the enclosure to an interior surface of the housing component; and
         a retention feature positioned along the interior surface of the housing component; and
      a dielectric component positioned within the opening, adhered to the housing component, and interlocked with the retention feature, the dielectric component defining a second exterior surface of the enclosure and including a thermoset composite material comprising an epoxy matrix and nano-sized silica particles dispersed within the epoxy matrix; and a RF component positioned within the enclosure and below the dielectric component.

9. The electronic device of claim 8, wherein:
the electronic device further comprises wireless transmission circuitry;
the RF component is an antenna operably coupled to the wireless transmission circuitry; and
the dielectric component defines an RF-transmissive window for the antenna.

10. The electronic device of claim 8, wherein:
the thermoset composite material has an ultimate tensile strength from 30 MPa to 50 MPa and an elongation from 10% to 15%.

11. The electronic device of claim 8, wherein:
the opening of the housing component is partially defined by:
 a first surface extending from a first portion of the first exterior surface of the enclosure to a first portion of the interior surface of the housing component; and
 a second surface facing the first surface and extending from a second portion of the first exterior surface of the enclosure to a second portion of the interior surface of the housing component; and
the dielectric component is adhered to each of the first and the second surfaces.

12. The electronic device of claim 11, wherein:
the retention feature is a first retention feature; and
the housing component further defines a second retention feature along the first surface and a third retention feature along the second surface.

13. The electronic device of claim 11, further comprising:
a first anodization layer along the first surface and defining a first set of nano-sized pores; and
a second anodization layer along the second surface and defining a second set of nano-sized pores, the dielectric component extending at least partially into the first set of nano-sized pores and the second set of nano-sized pores.

14. The electronic device of claim 13, wherein:
the housing component comprises a third anodization layer, different from the first anodization layer, along the first exterior surface of the enclosure.

\* \* \* \* \*